(12) United States Patent
Quan et al.

(10) Patent No.: US 10,491,420 B2
(45) Date of Patent: Nov. 26, 2019

(54) METHOD, TERMINAL, AND BASE STATION FOR ASYNCHRONOUS UPLINK TRANSMISSION

(71) Applicant: Huawei Technologies Co., Ltd., Shenzhen (CN)

(72) Inventors: Wei Quan, Beijing (CN); Bingzhao Li, Beijing (CN); Zhenxing Hu, Shenzhen (CN); Jian Zhang, Beijing (CN); Jinhua Miao, Beijing (CN); Xiaodong Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 83 days.

(21) Appl. No.: 15/663,337

(22) Filed: Jul. 28, 2017

(65) Prior Publication Data

US 2017/0331639 A1 Nov. 16, 2017

Related U.S. Application Data

(63) Continuation of application No. PCT/CN2015/071971, filed on Jan. 30, 2015.

(51) Int. Cl.
*H04L 12/433* (2006.01)
*H04W 72/04* (2009.01)
(Continued)

(52) U.S. Cl.
CPC ......... *H04L 12/433* (2013.01); *H04W 72/042* (2013.01); *H04W 72/0413* (2013.01); *H04W 72/1289* (2013.01); *H04W 74/0883* (2013.01)

(58) Field of Classification Search
CPC ............ H04L 12/433; H04W 72/0413; H04W 72/042; H04W 72/1289; H04W 74/0883
See application file for complete search history.

(56) References Cited

U.S. PATENT DOCUMENTS

| 2011/0038302 A1* | 2/2011 | Papasakellariou .... H04L 5/0007 370/315 |
| 2011/0216689 A1* | 9/2011 | Jenkins ................ H04W 40/00 370/315 |

(Continued)

FOREIGN PATENT DOCUMENTS

| CN | 101222240 A | 7/2008 |
| CN | 101568176 A | 10/2009 |

(Continued)

OTHER PUBLICATIONS iq.ip.com NPL search; Feb. 28, 2019 (Year: 2019).*

(Continued)

*Primary Examiner* — Benjamin H Elliott, IV
(74) *Attorney, Agent, or Firm* — Slater Matsil, LLP

(57) ABSTRACT

A method, a terminal, and a base station for asynchronous uplink transmission are provided, to reduce an uplink data transmission latency and signaling overheads when a terminal and a base station are in out-of-synchronization state. The method includes: obtaining asynchronous transmission parameter information that is the same as that of a base station, where asynchronous transmission parameter information includes physical resource information, modulation and coding scheme information, and physical resource frame format information, and the physical resource frame format information includes length information of a physical resource frame; determining a length of an asynchronous transmission frame according to the physical resource frame format information; and sending first uplink information to the base station according to the asynchronous transmission parameter information by using the asynchronous transmission frame.

20 Claims, 11 Drawing Sheets

(51) Int. Cl.
*H04W 72/12* (2009.01)
*H04W 74/08* (2009.01)

(56) References Cited

U.S. PATENT DOCUMENTS

| | | | |
|---|---|---|---|
| 2012/0147830 A1 | 6/2012 | Lohr et al. | |
| 2012/0231828 A1 | 9/2012 | Wang et al. | |
| 2012/0269156 A1 | 10/2012 | Quan et al. | |
| 2015/0009936 A1* | 1/2015 | Quan | H04W 74/008 370/329 |
| 2015/0245307 A1* | 8/2015 | Chen | H04W 56/0045 370/336 |
| 2016/0182206 A1 | 6/2016 | Nabar et al. | |
| 2016/0295609 A1* | 10/2016 | Vajapeyam | H04L 5/14 |
| 2016/0330766 A1* | 11/2016 | Liu | H04W 28/18 |
| 2017/0331639 A1* | 11/2017 | Quan | H04L 12/433 |

FOREIGN PATENT DOCUMENTS

| | | | |
|---|---|---|---|
| CN | 101755498 A | 6/2010 | |
| CN | 102118189 A | 7/2011 | |
| CN | 102118236 A | 7/2011 | |
| CN | 102118799 A | 7/2011 | |
| CN | 103716883 A | 4/2014 | |
| JP | 2012530434 A | 11/2012 | |
| JP | 2013516815 A | 5/2013 | |
| WO | WO-2013120458 A1 * | 8/2013 | H04W 74/008 |

OTHER PUBLICATIONS iq-ip.com Patent and PGPub search; Feb. 28, 2019 (Year: 2019).*
R1-143708; 3GPP TSG RAN WG1 Meeting #78bis; Power allocation in asynchronous dual connectivity; Oct. 6, 2014; Huawei (Year: 2014).*
R1-144216; 3GPP TSG-RAN WG1 #79; Power Control Synchronous and Asynchronous Operation; Interdigital Communications; Oct. 6, 2014 (Year: 2014).*
3GPP TSG-RAN2 Meeting #64, R2-087079,"TAT and RACH Procedure," Nokia Siemens Networks et al., Change Request, 36.321 CR 0142, V8.3.0, Prague, Czech Republic, Oct. 10-14, 2008, 3 pages.
"3rd Generation Partnership Project;Technical Specification Group Radio Access Network; Evolved Universal Terrestrial Radio Access (E-UTRA); Multiplexing and Channel Coding (Release 12)," 3GPP TS 36.212 V12.3.0, (Dec. 2014), 89 pages.
"3rd Generation Partnership Project; Technical Specification Group Radio Access Network; Evolved Universal Terrestrial Radio Access (E-UTRA); Physical Layer Procedures (Release 12)," 3GPP TS 36.213 V12.4.0 (Dec. 2014), 225 pages.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 12)," 3GPP TS 36.300 V12.4.0 (Dec. 2014), 251 pages.
"3rd Generation Partnership Project; Technical Specification Group Radio Access Network; Evolved Universal Terrestrial Radio Access (E-UTRA); Medium Access Control (MAC) Protocol Specification (Release 12)," 3GPP TS 36.321 V12.4.0 (Dec. 2014), 3GPP TS 36.321 V12.4.0 (Dec. 2014), 60 pages.

* cited by examiner

```
┌─────────────────────────────────────────────────────────────────────┐
│ Determine asynchronous transmission parameter information, where the asynchronous │
│ transmission parameter information includes physical resource information, modulation │
│ and coding scheme information, and physical resource frame format information, and │
│     the physical resource frame format information includes length information of a     │ 501
│  physical resource frame; the asynchronous transmission parameter information further  │
│ includes information about a condition of transmitting data by using a physical resource │
│    and period information; and the length information of the physical resource frame    │
│         includes length information of at least one of a frame header portion, a data         │
│    transmission portion, or a frame tail portion and/or total length information of the    │
│                                     physical resource frame                                     │
└─────────────────────────────────────────────────────────────────────┘
                                          ↓
┌─────────────────────────────────────────────────────────────────────┐
│     Receive first uplink information that is sent, for data information that meets the     │
│          condition of transmitting data by using the physical resource, by using a data          │ 502
│ transmission portion of the asynchronous transmission frame, where the asynchronous │
│ transmission frame includes a frame header portion, the data transmission portion, and │
│     a frame tail portion; and when a radio resource control RRC connection to the base     │
│ station is in connected state, the first uplink information includes at least one of a buffer │
│     status report, the data information, or a terminal identifier; or when a radio resource     │
│    control RRC connection to the base station is in idle state, the first uplink information    │
│     includes at least one of an RRC connection request message, the data information, or a     │
│ terminal identifier; or when a radio resource control RRC connection to the base station │
│         is re-established, the first uplink information includes at least one of an RRC         │
│      connection re-establishment request message, the data information, a buffer status      │
│                                    report, or a terminal identifier                                    │
└─────────────────────────────────────────────────────────────────────┘
                                          ↓
┌─────────────────────────────────────────────────────────────────────┐
│ Send downlink information to a terminal, where the downlink information includes an │
│ uplink timing adjustment command and a positive acknowledgment of the first uplink │
│     information; and when the radio resource control RRC connection to the terminal is in     │
│       connected state, the downlink information further includes a synchronization uplink       │
│        grant message and/or identification information of the terminal; or when the radio        │
│          resource control RRC connection to the terminal is in idle state, the downlink          │ 503
│       information further includes an RRC connection establishment message; or when the       │
│    radio resource control RRC connection to the terminal is re-established, the downlink    │
│      information further includes a synchronization uplink grant message and/or an RRC      │
│                               connection re-establishment message                               │
└─────────────────────────────────────────────────────────────────────┘
                                          ↓
┌─────────────────────────────────────────────────────────────────────┐
│     When the radio resource control RRC connection between the terminal and the base     │
│          station is in connected state, receive second uplink information that is sent by the          │
│          terminal according to the synchronization uplink grant message, where the second          │ 504
│       uplink information includes the data information; or when the radio resource control       │
│           RRC connection between the terminal and the base station is in idle state, receive           │
│ second uplink information that is sent by the terminal according to the RRC connection │
│              establishment message, where the second uplink information includes an RRC              │
│      connection establishment complete message; or when the radio resource control RRC      │
│      connection between the terminal and the base station is re-established, receive second      │
│        uplink information that is sent by the terminal according to the RRC connection re-        │
│            establishment message, where the second uplink information includes an RRC            │
│           connection re-establishment complete message and/or the data information           │
└─────────────────────────────────────────────────────────────────────┘
```

FIG. 13

METHOD, TERMINAL, AND BASE STATION FOR ASYNCHRONOUS UPLINK TRANSMISSION

CROSS-REFERENCE TO RELATED APPLICATIONS

This application is a continuation of International Application No. PCT/CN2015/071971, filed on Jan. 30, 2015, the disclosure of which is hereby incorporated by reference in its entirety.

TECHNICAL FIELD

The present invention relates to the communications field, and in particular, to a method, a terminal, and a base station for asynchronous uplink transmission.

BACKGROUND

Generally, synchronization between a terminal and a network mainly includes two processes: frame synchronization and time synchronization. The frame synchronization refers to downlink synchronization. The time synchronization refers to uplink synchronization. For example, in LTE (Long Term Evolution), time at which uplink signals of different UEs (User Equipment) arrive at an eNB (evolved Node B) needs to be aligned, to reduce interference between UE uplink signals. If UE moves in a direction far away from the base station during a call, a signal sent from the base station arrives at the UE "later and later", and a signal of the UE also arrives at the base station "later and later". If a delay is excessively long, a current timeslot in which the base station receives the signal of the UE overlap a next timeslot in which the base station receives another UE signal, causing intercode interference. Uplink transmission time alignment is implemented by applying a TA (Timing Advance) on a UE side. The TA may enable UE to send a signal earlier.

In the prior art, establishment of a communication connection to an eNB by UE includes a contention-based random access process and a non-contention-based random access process. The contention-based random access process includes the following steps: First, the UE randomly selects a preamble, and sends the preamble to the eNB on an available PRACH (Physical Random Access Channel) resource. Second, after receiving the preamble sent by the UE, the eNB sends a random access response RAR message to the UE. The message carries uplink grant information and UE uplink timing advance information. Third, the UE sends an uplink message to the eNB according to an uplink grant and the timing advance information in the RAR. The uplink message includes content that can identify the UE. Fourth, the eNB sends a contention resolution message to the UE, and the UE determines, according to the contention resolution message, whether the random access process is successfully completed. The non-contention-based random access process includes the following steps: First, the eNB configures a dedicated preamble for the UE, and optionally, further configures a PRACH resource for sending the preamble. Second, the UE sends the dedicated preamble to the eNB on an available PRACH resource. Third, after receiving the preamble, the eNB sends a random access response RAR message to the UE. The message carries uplink grant information and UE uplink timing advance information. When receiving the corresponding random access response message, the UE considers that the random access process is successfully completed, and performs a subsequent data receiving and sending process.

When UE is in RRC (Radio Resource Control) connected state and keeps uplink synchronization, the UE may send uplink data. A process of sending uplink data by the UE is generally as follows: Step 1: When uplink data arrives at the UE, a BSR (Buffer Status Report) is triggered when a particular condition is met. If there is no uplink resource for sending the BSR, an SR (Scheduling Request) is triggered. The SR indicates that uplink data of the UE triggers a BSR, and needs to be sent. Step 2: After receiving the SR, an eNB can determine only that the UE has uplink data needing to be sent, but does not know any other information about the data buffered by the UE. The eNB allocates an uplink resource to the UE according to a scheduling algorithm, and sends a UL Grant (Up Load Grant) to the UE to notify the uplink resource allocated to the UE. Step 3: After receiving the UL Grant, the UE sends a BSR to the eNB on the uplink resource allocated to the UE, to notify the eNB of a volume of currently buffered uplink data. Step 4: After receiving the BSR, the eNB knows relatively accurately the uplink data volume of the UE, and allocates a proper uplink resource to the UE according to the scheduling algorithm, and sends a UL Grant (uplink grant) to the UE to notify the uplink resource allocated to the UE. Step 5: After receiving the UL Grant, the UE performs uplink data transmission on the uplink resource allocated to the UE. However, some UEs do not have a dedicated SR resource. If UE does not have a dedicated SR resource, or UE is in uplink out-of-synchronization state, the UE needs to perform a random access process to request an uplink data transmission resource. When the UE has uplink data to be transmitted, the UE needs to first request a resource or establish an RRC connection and a data bearer. This greatly increases signaling overheads and a latency.

SUMMARY

Embodiments of the present invention provide a method, a terminal, and a base station for asynchronous uplink transmission, to reduce an uplink data transmission latency and signaling overheads when a terminal and a base station are in out-of-synchronization state.

A first aspect of the embodiments of the present invention provides a method for asynchronous uplink transmission, including: obtaining asynchronous transmission parameter information that is the same as that of a base station, where the asynchronous transmission parameter information includes physical resource information, modulation and coding scheme information, and physical resource frame format information, and the physical resource frame format information includes length information of a physical resource frame; determining a length of an asynchronous transmission frame according to the physical resource frame format information; and sending first uplink information to the base station according to the asynchronous transmission parameter information by using the asynchronous transmission frame.

With reference to the first aspect of the embodiments of the present invention, in a first implementation manner of the first aspect of the embodiments of the present invention, when a radio resource control RRC connection to the base station is in connected state, the first uplink information includes at least one of a buffer status report, data information, or a terminal identifier; or when a radio resource control RRC connection to the base station is in idle state, the first uplink information includes at least one of an RRC connection request message, data information, or a terminal identifier; or when a radio resource control RRC connection to the base station is re-established, the first uplink information includes at least one of an RRC connection re-establishment request message, data information, a buffer status report, or a terminal identifier.

With reference to the first aspect of the embodiments of the present invention or the first implementation manner of the first aspect, in a second implementation manner of the first aspect of the embodiments of the present invention, the asynchronous transmission parameter information further includes information about a condition of transmitting data by using a physical resource; and the sending first uplink information to the base station according to the asynchronous transmission parameter information by using the asynchronous transmission frame includes: sending, for data information that meets the condition of transmitting data by using the physical resource, the first uplink information to the base station by using a data transmission portion of the asynchronous transmission frame.

With reference to the first aspect of the embodiments of the present invention or the first implementation manner of the first aspect, in a third implementation manner of the first aspect of the embodiments of the present invention, the length information of the physical resource frame includes: length information of at least one of a frame header portion, a data transmission portion, or a frame tail portion and/or total length information of the physical resource frame.

With reference to the first aspect of the embodiments of the present invention or the first implementation manner of the first aspect, in a fourth implementation manner of the first aspect of the embodiments of the present invention, the asynchronous transmission parameter information further includes period information, used to indicate a physical resource use period.

With reference to the first implementation manner of the first aspect of the embodiments of the present invention, in a fifth implementation manner of the first aspect of the embodiments of the present invention, after the sending first uplink information to the base station according to the asynchronous transmission parameter information by using the asynchronous transmission frame, the method further includes: receiving downlink information sent by the base station, where the downlink information includes an uplink timing adjustment command and a positive acknowledgment of the first uplink information; and when the radio resource control RRC connection to the base station is in connected state, the downlink information further includes a synchronization uplink grant message and/or identification information of the terminal; or when the radio resource control RRC connection to the base station is in idle state, the downlink information further includes an RRC connection establishment message; or when the radio resource control RRC connection to the base station is re-established, the downlink information further includes a synchronization uplink grant message and/or an RRC connection re-establishment message.

With reference to the fifth implementation manner of the first aspect of the embodiments of the present invention, in a sixth implementation manner of the first aspect of the embodiments of the present invention, after the receiving downlink information sent by the base station, the method further includes: when the radio resource control RRC connection to the base station is in connected state, applying a timing adjustment command, starting a timing adjustment timer, and sending second uplink information to the base station according to the synchronization uplink grant message, where the second uplink information includes the data information; or when the radio resource control RRC connection to the base station is in idle state, sending second uplink information to the base station according to the RRC connection establishment message, where the second uplink information includes an RRC connection establishment complete message; or when the radio resource control RRC connection to the base station is re-established, sending second uplink information to the base station according to the RRC connection re-establishment message, where the second uplink information includes an RRC connection re-establishment complete message and/or the data information.

With reference to the first aspect of the embodiments of the present invention or the first implementation manner of the first aspect, in a seventh implementation manner of the first aspect of the embodiments of the present invention, the asynchronous transmission frame further includes a physical random access channel PRACH resource portion, and before the sending first uplink information to the base station according to the asynchronous transmission parameter information by using the asynchronous transmission frame, the method further includes: obtaining a preamble; the sending first uplink information to the base station according to the asynchronous transmission parameter information by using the asynchronous transmission frame further includes: sending the preamble to the base station by using the PRACH resource portion; and after the sending the preamble to the base station by using the PRACH resource portion, the method further includes: receiving a random access response message sent by the base station, where the random access response message includes synchronization uplink grant information and uplink timing advance information; and applying the random access response message, and sending second uplink information to the base station, where the second uplink information includes the data information.

With reference to the first aspect of the embodiments of the present invention or the first implementation manner of the first aspect, in an eighth implementation manner of the first aspect of the embodiments of the present invention, the method further includes: obtaining a preamble; and sending the preamble to the base station by using a physical random access channel PRACH resource, where the physical random access channel PRACH resource and the asynchronous transmission frame are aligned in a time domain; and after the sending the preamble to the base station by using a physical random access channel PRACH resource, the method further includes: receiving a random access response message sent by the base station, where the random access response message includes synchronization uplink grant information and uplink timing advance information; and applying the random access response message, and sending second uplink information to the base station, where the second uplink information includes the data information.

With reference to the first aspect of the embodiments of the present invention or the first implementation manner of the first aspect, in a ninth implementation manner of the first aspect of the embodiments of the present invention, the obtaining asynchronous transmission parameter information that is the same as that of a base station includes: obtaining the asynchronous transmission parameter information in at least one manner of receiving a radio resource control RRC layer message, receiving a Media Access Control layer message, receiving a physical layer message, or protocol pre-configuration.

A second aspect of the embodiments of the present invention provides a method for asynchronous uplink transmission, including: determining asynchronous transmission parameter information, where the asynchronous transmission parameter information includes physical resource information, modulation and coding scheme information, and physical resource frame format information, and the physical resource frame format information includes length information of a physical resource frame; and receiving first uplink information that is sent by a terminal according to the asynchronous transmission parameters by using an asynchronous transmission frame.

With reference to the second aspect of the embodiments of the present invention, in a first implementation manner of the second aspect of the embodiments of the present invention, when a radio resource control RRC connection between the terminal and a base station is in connected state, the first uplink information includes at least one of a buffer status report, data information, or a terminal identifier; or when a radio resource control RRC connection between the terminal and a base station is in idle state, the first uplink information includes at least one of an RRC connection request message, data information, or a terminal identifier; or when a radio resource control RRC connection between the terminal and a base station is in re-established state, the first uplink information includes at least one of an RRC connection re-establishment request message, data information, a buffer status report, or a terminal identifier.

With reference to the second aspect of the embodiments of the present invention or the first implementation manner of the second aspect, in a second implementation manner of the second aspect of the embodiments of the present invention, the asynchronous transmission parameter information further includes information about a condition of transmitting data by using a physical resource; and the receiving first uplink information that is sent by a terminal according to the asynchronous transmission parameters by using an asynchronous transmission frame includes: receiving the first uplink information that is sent, for data information that meets the condition of transmitting data by using the physical resource, by using a data transmission portion of the asynchronous transmission frame.

With reference to the second aspect of the embodiments of the present invention or the first implementation manner of the second aspect, in a third implementation manner of the second aspect of the embodiments of the present invention, the length information of the physical resource frame includes: length information of at least one of a frame header portion, a data transmission portion, or a frame tail portion and/or total length information of the physical resource frame.

With reference to the second aspect of the embodiments of the present invention or the first implementation manner of the second aspect, in a fourth implementation manner of the second aspect of the embodiments of the present invention, the asynchronous transmission parameter information further includes period information, used to indicate a physical resource use period.

With reference to the first implementation manner of the second aspect of the embodiments of the present invention, in a fifth implementation manner of the second aspect of the embodiments of the present invention, after the receiving first uplink information that is sent by a terminal according to the asynchronous transmission parameters by using an asynchronous transmission frame, the method further includes: sending downlink information to the terminal, where the downlink information includes an uplink timing adjustment command and a positive acknowledgment of the first uplink information; and when the radio resource control RRC connection between the terminal and the base station is in connected state, the downlink information further includes a synchronization uplink grant message and/or identification information of the terminal; or when the radio resource control RRC connection between the terminal and the base station is in idle state, the downlink information further includes an RRC connection establishment message; or when the radio resource control RRC connection between the terminal and the base station is in re-established state, the downlink information further includes a synchronization uplink grant message and/or an RRC connection re-establishment message.

With reference to the fifth implementation manner of the second aspect of the embodiments of the present invention, in a sixth implementation manner of the second aspect of the embodiments of the present invention, after the sending downlink information to the terminal, the method further includes: when the radio resource control RRC connection between the terminal and the base station is in connected state, receiving second uplink information that is sent by the terminal according to the synchronization uplink grant message, where the second uplink information includes the data information; or when the radio resource control RRC connection between the terminal and the base station is in idle state, receiving second uplink information that is sent by the terminal according to the RRC connection establishment message, where the second uplink information includes an RRC connection establishment complete message; or when the radio resource control RRC connection between the terminal and the base station is re-established, receiving second uplink information that is sent by the terminal according to the RRC connection re-establishment message, where the second uplink information includes an RRC connection re-establishment complete message and/or the data information.

With reference to the second aspect of the embodiments of the present invention or the first implementation manner of the second aspect, in a seventh implementation manner of the second aspect of the embodiments of the present invention, the asynchronous transmission frame further includes a physical random access channel PRACH resource portion, and the receiving first uplink information that is sent by a terminal according to the asynchronous transmission parameters by using an asynchronous transmission frame further includes: receiving a preamble that is sent by the terminal by using the PRACH resource portion; sending a random access response message to the terminal, where the random access response message includes synchronization uplink grant information and uplink timing advance information; and receiving second uplink information sent by the terminal, where the second uplink information includes the data information.

With reference to the second aspect of the embodiments of the present invention or the first implementation manner of the second aspect, in an eighth implementation manner of the second aspect of the embodiments of the present invention, the method further includes: receiving a preamble that is sent by the terminal by using a random access channel PRACH resource, where the physical random access channel PRACH resource and the asynchronous transmission frame are aligned in a time domain; sending a random access response message to the terminal, where the random access response message includes synchronization uplink grant information and uplink timing advance information; and receiving second uplink information sent by the terminal, where the second uplink information includes the data information.

With reference to the second aspect of the embodiments of the present invention or the first implementation manner of the second aspect, in a ninth implementation manner of the second aspect of the embodiments of the present invention, after the determining asynchronous transmission parameter information, the method further includes: notifying the terminal of the asynchronous transmission parameter information in at least one manner of sending a radio resource control RRC layer message, sending a Media Access Control layer message, sending a physical layer message, or protocol pre-configuration.

A third aspect of the embodiments of the present invention provides a terminal, including: a first obtaining unit, configured to obtain asynchronous transmission parameter information that is the same as that of a base station, where the asynchronous transmission parameter information includes physical resource information, modulation and coding scheme information, and physical resource frame format information, and the physical resource frame format information includes length information of a physical resource frame; a first determining unit, configured to determine a length of an asynchronous transmission frame according to the physical resource frame format information; and a first sending unit, configured to send first uplink information to the base station according to the asynchronous transmission parameter information by using the asynchronous transmission frame.

With reference to the third aspect of the embodiments of the present invention, in a first implementation manner of the third aspect of the embodiments of the present invention, when a radio resource control RRC connection to the base station is in connected state, the first uplink information includes at least one of a buffer status report, data information, or a terminal identifier; or when a radio resource control RRC connection to the base station is in idle state, the first uplink information includes at least one of an RRC connection request message, data information, or a terminal identifier; or when a radio resource control RRC connection to the base station is re-established, the first uplink information includes at least one of an RRC connection re-establishment request message, data information, a buffer status report, or a terminal identifier.

With reference to the third aspect of the embodiments of the present invention or the first implementation manner of the third aspect, in a second implementation manner of the third aspect of the embodiments of the present invention, the asynchronous transmission parameter information further includes information about a condition of transmitting data by using a physical resource; and the first sending unit includes: a first sending module, configured to send, for data information that meets the condition of transmitting data by using the physical resource, the first uplink information to the base station by using the data transmission portion.

With reference to the third aspect of the embodiments of the present invention or the first implementation manner of the third aspect, in a third implementation manner of the third aspect of the embodiments of the present invention, the length information of the physical resource frame includes: length information of at least one of a frame header portion, a data transmission portion, or a frame tail portion and/or total length information of the physical resource frame.

With reference to the third aspect of the embodiments of the present invention or the first implementation manner of the third aspect, in a fourth implementation manner of the third aspect of the embodiments of the present invention, the asynchronous transmission parameter information further includes period information, used to indicate a physical resource use period.

With reference to the second implementation manner of the third aspect of the embodiments of the present invention, in a fifth implementation manner of the third aspect of the embodiments of the present invention, after the first uplink information is sent to the base station according to the asynchronous transmission parameter information by using the asynchronous transmission frame, the terminal further includes: a first receiving unit, configured to receive downlink information sent by the base station, where the downlink information includes an uplink timing adjustment command and a positive acknowledgment of the first uplink information; and when the radio resource control RRC connection to the base station is in connected state, the downlink information further includes a synchronization uplink grant message and/or identification information of the terminal; or when the radio resource control RRC connection to the base station is in idle state, the downlink information further includes an RRC connection establishment message; or when the radio resource control RRC connection to the base station is re-established, the downlink information further includes a synchronization uplink grant message and/or an RRC connection re-establishment message.

With reference to the fifth implementation manner of the third aspect of the embodiments of the present invention, in a sixth implementation manner of the third aspect of the embodiments of the present invention, after the downlink information sent by the base station is received, the terminal further includes: a first applying unit, configured to: when the radio resource control RRC connection to the base station is in connected state, apply a timing adjustment command, and start a timing adjustment timer; and a second sending unit, configured to: when the radio resource control RRC connection to the base station is in connected state, send second uplink information to the base station according to the synchronization uplink grant message, where the second uplink information includes the data information; or when the radio resource control RRC connection to the base station is in idle state, send second uplink information to the base station according to the RRC connection establishment message, where the second uplink information includes an RRC connection establishment complete message; or when the radio resource control RRC connection to the base station is re-established, send second uplink information to the base station according to the RRC connection re-establishment message, where the second uplink information includes an RRC connection re-establishment complete message and/or the data information.

With reference to the third aspect of the embodiments of the present invention or the first implementation manner of the third aspect, in a seventh implementation manner of the third aspect of the embodiments of the present invention, the asynchronous transmission frame further includes a physical random access channel PRACH resource portion, and before the first uplink information is sent to the base station according to the asynchronous transmission parameter information by using the asynchronous transmission frame, the terminal further includes: a second obtaining unit, configured to obtain a preamble; the first sending unit further includes: a second sending module, configured to send the preamble to the base station by using the PRACH resource portion; and after the preamble is sent to the base station by using the PRACH resource portion, the terminal further includes: a second receiving unit, configured to receive a random access response message sent by the base station, where the random access response message includes synchronization uplink grant information and uplink timing advance information; a second applying unit, configured to apply the random access response message; and a third sending unit, configured to send second uplink information to the base station, where the second uplink information includes the data information.

With reference to the third aspect of the embodiments of the present invention or the first implementation manner of the third aspect, in an eighth implementation manner of the third aspect of the embodiments of the present invention, the terminal further includes: a third obtaining unit, configured to obtain a preamble; the first sending module further includes: a third sending module, configured to send the preamble to the base station by using a physical random access channel PRACH resource, where the physical random access channel PRACH resource and the asynchronous transmission frame are aligned in a time domain; and after the preamble is sent to the base station by using a physical random access channel PRACH resource, the terminal further includes: a third receiving unit, configured to receive a random access response message sent by the base station, where the random access response message includes synchronization uplink grant information and uplink timing advance information; a third applying unit, configured to apply the random access response message; and a fourth sending unit, configured to send second uplink information to the base station, where the second uplink information includes the data information.

With reference to the third aspect of the embodiments of the present invention or the first implementation manner of the third aspect, in a ninth implementation manner of the third aspect of the embodiments of the present invention, the first obtaining unit further includes: a first obtaining module, configured to obtain the asynchronous transmission parameter information in at least one manner of receiving a radio resource control RRC layer message, receiving a Media Access Control layer message, receiving a physical layer message, or protocol pre-configuration.

A fourth aspect of the embodiments of the present invention provides a base station, including: a second determining unit, configured to determine asynchronous transmission parameter information, where the asynchronous transmission parameter information includes physical resource information, modulation and coding scheme information, and physical resource frame format information, and the physical resource frame format information includes length information of a physical resource frame; and a fourth receiving unit, configured to receive first uplink information that is sent by a terminal according to the asynchronous transmission parameters by using an asynchronous transmission frame.

With reference to the fourth aspect of the embodiments of the present invention, in a first implementation manner of the fourth aspect of the embodiments of the present invention, when a radio resource control RRC connection between the terminal and the base station is in connected state, the first uplink information includes at least one of a buffer status report, data information, or a terminal identifier; or when a radio resource control RRC connection between the terminal and the base station is in idle state, the first uplink information includes at least one of an RRC connection request message, data information, or a terminal identifier; or when a radio resource control RRC connection between the terminal and the base station is in re-established state, the first uplink information includes at least one of an RRC connection re-establishment request message, data information, a buffer status report, or a terminal identifier.

With reference to the fourth aspect of the embodiments of the present invention or the first implementation manner of the fourth aspect, in a second implementation manner of the fourth aspect of the embodiments of the present invention, the asynchronous transmission parameter information further includes information about a condition of transmitting data by using a physical resource; and the fourth receiving unit includes: a fourth receiving module, configured to receive the first uplink information that is sent, for data information that meets the condition of transmitting data by using the physical resource, by using a data transmission portion of the asynchronous transmission frame.

With reference to the fourth aspect of the embodiments of the present invention or the first implementation manner of the fourth aspect, in a third implementation manner of the fourth aspect of the embodiments of the present invention, the length information of the physical resource frame includes: length information of at least one of a frame header portion, a data transmission portion, or a frame tail portion and/or total length information of the physical resource frame.

With reference to the fourth aspect of the embodiments of the present invention or the first implementation manner of the fourth aspect, in a fourth implementation manner of the fourth aspect of the embodiments of the present invention, the asynchronous transmission parameter information further includes period information, used to indicate a physical resource use period.

With reference to the first implementation manner of the fourth aspect of the embodiments of the present invention, in a fifth implementation manner of the fourth aspect of the embodiments of the present invention, after the first uplink information that is sent by the terminal according to the asynchronous transmission parameters by using the asynchronous transmission frame is received, the base station further includes: a fifth sending unit, configured to send downlink information to the terminal, where the downlink information includes an uplink timing adjustment command and a positive acknowledgment of the first uplink information; and when the radio resource control RRC connection between the terminal and the base station is in connected state, the downlink information further includes a synchronization uplink grant message and/or identification information of the terminal; or when the radio resource control RRC connection between the terminal and the base station is in idle state, the downlink information further includes an RRC connection establishment message; or when the radio resource control RRC connection between the terminal and the base station is in re-established state, the downlink information further includes a synchronization uplink grant message and/or an RRC connection re-establishment message.

With reference to the fifth implementation manner of the fourth aspect of the embodiments of the present invention, in a sixth implementation manner of the fourth aspect of the embodiments of the present invention, after the downlink information is sent to the terminal, the base station further includes: a fifth receiving unit, configured to: when the radio resource control RRC connection between the terminal and the base station is in connected state, receive second uplink information that is sent by the terminal according to the synchronization uplink grant message, where the second uplink information includes the data information; or when the radio resource control RRC connection between the terminal and the base station is in idle state, receive second uplink information that is sent by the terminal according to the RRC connection establishment message, where the second uplink information includes an RRC connection establishment complete message; or when the radio resource control RRC connection between the terminal and the base station is in re-established, receive second uplink information that is sent by the terminal according to the RRC connection re-establishment message, where the second uplink information includes an RRC connection re-establishment complete message and/or the data information.

With reference to the fourth aspect of the embodiments of the present invention or the first implementation manner of the fourth aspect, in a seventh implementation manner of the fourth aspect of the embodiments of the present invention, the asynchronous transmission frame further includes a physical random access channel PRACH resource portion, and the fourth receiving unit further includes: a fifth receiving module, configured to receive a preamble that is sent by the terminal by using the PRACH resource portion; a sixth sending unit, configured to send a random access response message to the terminal, where the random access response message includes synchronization uplink grant information and uplink timing advance information; and a sixth receiving unit, configured to receive second uplink information sent by the terminal, where the second uplink information includes the data information.

With reference to the fourth aspect of the embodiments of the present invention or the first implementation manner of the fourth aspect, in an eighth implementation manner of the fourth aspect of the embodiments of the present invention, the base station further includes: a seventh receiving unit, configured to receive a preamble that is sent by the terminal by using a random access channel PRACH resource, where the physical random access channel PRACH resource and the asynchronous transmission frame are aligned in a time domain; send a random access response message to the terminal, where the random access response message includes synchronization uplink grant information and uplink timing advance information; and receive second uplink information sent by the terminal, where the second uplink information includes the data information.

With reference to the fourth aspect of the embodiments of the present invention or the first implementation manner of the fourth aspect, in a ninth implementation manner of the fourth aspect of the embodiments of the present invention, after the asynchronous transmission parameter information is determined, the base station further includes: a notification unit, configured to notify the terminal of the asynchronous transmission parameter information in at least one manner of sending a radio resource control RRC layer message, sending a Media Access Control layer message, sending a physical layer message, or protocol pre-configuration.

The embodiments of the present invention provide a method for asynchronous uplink transmission, to reduce an uplink data transmission latency and signaling overheads when a terminal and a base station are in out-of-synchronization state. The method includes: obtaining asynchronous transmission parameter information that is the same as that of a base station, where asynchronous transmission parameter information includes physical resource information, modulation and coding scheme information, and physical resource frame format information, and the physical resource frame format information includes length information of a physical resource frame; determining a length of an asynchronous transmission frame according to the physical resource frame format information; and sending first uplink information to the base station according to the asynchronous transmission parameter information by using the asynchronous transmission frame. Because the asynchronous transmission parameter information obtained by a terminal is the same as that of the base station, the length of the asynchronous transmission frame that is determined by the terminal is the same as that determined by the base station. Therefore, even though in out-of-synchronization state, when the terminal sends the first uplink information to the base station according to the asynchronous transmission parameter information by using the asynchronous transmission frame, the base station can still receive the first uplink information, implementing uplink transmission on data without first establishing an RRC connection by using signaling. In this way, an uplink data transmission latency and signaling overheads in out-of-synchronization state are reduced.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 13 is a schematic diagram of an embodiment of a method for asynchronous uplink transmission according to an embodiment of the present invention;

DETAILED DESCRIPTION OF ILLUSTRATIVE EMBODIMENTS

Embodiments of the present invention provide a method, a terminal, and a base station for asynchronous uplink transmission, to reduce an uplink data transmission latency and signaling overheads when a terminal and a base station are in out-of-synchronization state.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person skilled in the art based on the embodiments of the present invention without creative efforts shall fall within the protection scope of the present invention.

Figure 1:
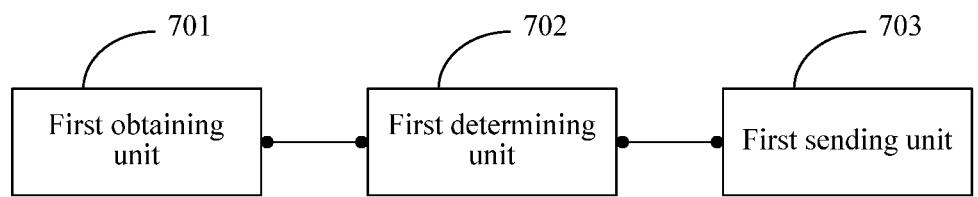
FIG. 1 is a schematic diagram of an embodiment of a terminal for asynchronous uplink transmission according to an embodiment of the present invention.

Referring to FIG. 1, an embodiment of a terminal according to an embodiment of the present invention includes the following units.

A first obtaining unit 701 is configured to obtain asynchronous transmission parameter information that is the same as that of a base station. The asynchronous transmission parameter information includes physical resource information, modulation and coding scheme information, and physical resource frame format information, and the physical resource frame format information includes length information of a physical resource frame.

After determining asynchronous transmission parameters according to a requirement, the base station first sends the asynchronous transmission parameter information to the terminal. Alternatively, the terminal may obtain, in another manner, for example, protocol configuration, the asynchronous transmission parameter information that is the same as that of the base station. To implement signaling exchange, the asynchronous transmission parameters need to include the physical resource information and the modulation and coding scheme information. To implement asynchronous transmission, the asynchronous transmission parameters further need to include the length information of the physical resource frame.

A first determining unit 702 is configured to determine a length of an asynchronous transmission frame according to the physical resource frame format information. The asynchronous transmission frame includes a frame header portion, a data transmission portion, and a frame tail portion.

The terminal configures the asynchronous transmission frame according to the length information of the physical resource frame. The length of the asynchronous transmission frame is a length required by asynchronous transmission between the terminal and the base station.

A first sending unit 703 configured to send first uplink information to the base station according to the asynchronous transmission parameter information by using the asynchronous transmission frame.

Because the terminal sends the first uplink information to the base station according to the necessary asynchronous transmission parameter information by using the asynchronous transmission frame having the required length, the base station receives the asynchronous transmission frame, and may obtain the first uplink information. It should be noted that, when the terminal sends the first uplink information to the base station by using the asynchronous transmission frame, a used timing advance is 0. That is, the terminal determines a timing for receiving a downlink signal, uses the determined timing for receiving a downlink signal as a reference, and sends the first uplink information to the base station by using the asynchronous transmission frame.

In this embodiment of the present invention, asynchronous transmission parameter information that is the same as that of a base station is obtained. The asynchronous transmission parameter information includes physical resource information, modulation and coding scheme information, and physical resource frame format information, and the physical resource frame format information includes length information of a physical resource frame. A length of an asynchronous transmission frame is determined according to the physical resource frame format information. First uplink information is sent to the base station according to the asynchronous transmission parameter information by using the asynchronous transmission frame. Because the asynchronous transmission parameter information obtained by the terminal is the same as that of the base station, the length of the asynchronous transmission frame that is determined by the terminal is the same as that determined by the base station. Therefore, even though in out-of-synchronization state, when the terminal sends the first uplink information to the base station according to the asynchronous transmission parameter information by using the asynchronous transmission frame, the base station can still receive the first uplink information, implementing uplink transmission on data without first establishing an RRC connection by using signaling. In this way, an uplink data transmission latency and signaling overheads in out-of-synchronization state are reduced.

Figure 2:
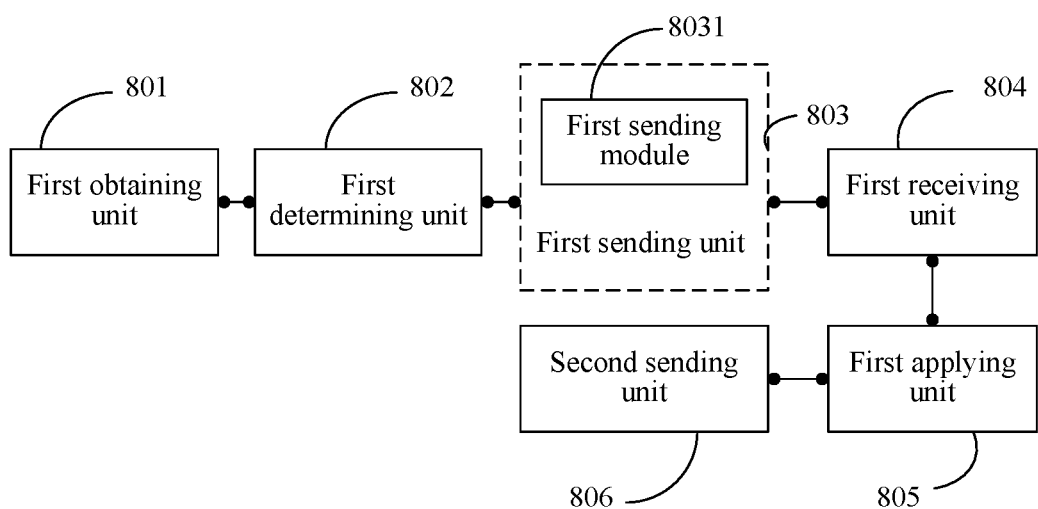
FIG. 2 is a schematic diagram of another embodiment of a terminal for asynchronous uplink transmission according to an embodiment of the present invention.

As described in the foregoing embodiment, a terminal receives asynchronous transmission parameter information sent by a base station. The asynchronous transmission parameter information includes physical resource information, modulation and coding scheme information, and length information of a physical resource frame. The terminal configures an asynchronous transmission frame, and sends first uplink information to the base station according to the asynchronous transmission parameter information by using the asynchronous transmission frame. In an actual application, specific content of the first uplink information may be determined according to a state of a connection between the terminal and the base station. The asynchronous transmission parameter information further includes information about a condition of transmitting data by using a physical resource. The length information of the physical resource may be a specific portion of the physical frame. The asynchronous transmission parameters may further include period information. The terminal may further receive downlink information sent by the base station, and send second uplink information to the base station. A specific description is provided below. Referring to FIG. 2, another embodiment of a terminal according to an embodiment of the present invention includes the following units.

A first obtaining unit 801 is configured to obtain asynchronous transmission parameter information that is the same as that of a base station. The asynchronous transmission parameter information includes physical resource information, modulation and coding scheme information, and physical resource frame format information, and the physical resource frame format information includes length information of a physical resource frame. The asynchronous transmission parameter information further includes information about a condition of transmitting data by using a physical resource and period information. The length information of the physical resource frame includes length information of at least one of a frame header portion, a data transmission portion, or a frame tail portion and/or total length information of the physical resource frame.

After determining asynchronous transmission parameters according to a requirement, the base station first sends the asynchronous transmission parameter information to the terminal. Alternatively, the terminal may obtain, in another manner, for example, protocol configuration, the asynchronous transmission parameter information that is the same as that of the base station. To implement signaling exchange, the asynchronous transmission parameters need to include the physical resource information and the modulation and coding scheme information. The physical resource is a time-frequency domain resource, and may be a PRB (physical resource block, physical resource block) location in an LTE (Long Term Evolution, Long Term Evolution) system. A modulation and coding scheme may be QPSK (Quadrature Phase Shift Keying, quadrature phase shift keying) or 1/2 coding or the like. To implement asynchronous transmission, the asynchronous transmission parameters further need to include the length information of the physical resource frame. To improve accuracy of uplink information received by the base station, the asynchronous transmission parameter information may further include the information about the condition of transmitting data by using the physical resource, that is, which radio bearer data may be transmitted on the physical resource. To save a channel resource, the asynchronous transmission parameter information further includes the period information, used to indicate a period used by the base station to send the physical resource, that is, how often the physical resource may be sent, or a how many times the physical resource may be sent. Length information of any portion of the physical resource frame and/or the total length information of the physical resource frame may be set according to an actual requirement, so that a length of an asynchronous transmission frame that is configured according to the physical resource frame is a length of a frame whose reception is allowed by the base station. The asynchronous transmission parameter information may further include an identifier associated with the physical resource. No limitation is set herein.

A method for determining asynchronous data transmission parameters by the base station may be implemented as follows. The parameters are semi-statically configured by using an RRC message, for example, a broadcast message or a dedicated RRC message. Alternatively, the parameters are dynamically configured by using a MAC layer or physical layer message, for example, a MAC CE or PDCCH signaling. Alternatively, the parameters are configured by using an RRC message and a MAC layer or physical layer message. Some parameters are notified by using the RRC message, and the other messages are notified by using the MAC layer or physical layer message. Alternatively, some parameters, for example, the length information of the physical resource frame, are fixed by using a protocol, and the other parameters are notified to the terminal in the foregoing manner. Optionally, the asynchronous transmission parameters may be sent to the terminal by using one or more messages. The asynchronous transmission parameters may be used by one terminal alone, or shared by multiple terminals. No limitation is set herein.

A first determining unit 802 is configured to determine a length of an asynchronous transmission frame according to the physical resource frame format information. The asynchronous transmission frame includes a frame header portion, a data transmission portion, and a frame tail portion.

The terminal configures the asynchronous transmission frame according to the length information of the physical resource frame. The length of the asynchronous transmission frame is a length required by asynchronous transmission between the terminal and the base station. Optionally, multiple asynchronous transmission frame formats may be further pre-configured. Each asynchronous transmission frame format corresponds to an identifier. The length information of the physical resource frame in the asynchronous transmission parameter information may also be an identifier. The terminal determines a specific used asynchronous transmission frame format according to the identifier, to determine the length of the asynchronous transmission frame.

The first sending unit 803 includes a first sending module 8031, configured to send, for data information that meets the condition of transmitting data by using the physical resource, first uplink information to the base station by using the data transmission portion of the asynchronous transmission frame. When a radio resource control RRC connection to the base station is in connected state, the first uplink information includes at least one of a buffer status report, the data information, or a terminal identifier. Alternatively, when a radio resource control RRC connection to the base station is in idle state, the first uplink information includes at least one of an RRC connection request message, the data information, or a terminal identifier. Alternatively, when a radio resource control RRC connection to the base station is re-established, the first uplink information includes at least one of an RRC connection re-establishment request message, the data information, a buffer status report, or a terminal identifier.

Because the terminal sends the first uplink information to the base station according to the necessary asynchronous transmission parameter information by using the asynchronous transmission frame having the required length, the base station receives the asynchronous transmission frame, and may obtain the first uplink information. It should be noted that, when the terminal sends the first uplink information to the base station by using the asynchronous transmission frame, a used timing advance is 0. That is, the terminal determines a timing for receiving a downlink signal, uses the determined timing for receiving a downlink signal as a reference, and sends the first uplink information to the base station by using the asynchronous transmission frame. Transmitting, by using the data transmission portion, the data information that meets the condition of transmitting data by using the physical resource may avoid causing interference to data of another terminal in close time. The terminal may determine content of the first uplink information according to different states of the RRC connection to the base station. If the terminal is in RRC connected state, the terminal may directly send the buffer status report, to indicate a volume of data of the terminal that requires uplink transmission, and may further directly perform uplink transmission on the data information and the terminal identifier. For example, the terminal identifier is a C-RNTI (CellRadioNetworkTemporaryIdentifier, cell radio network temporary identifier). It should be noted that, when the asynchronous transmission parameters are used by the terminal alone, the identifier does not need to be carried. If the terminal is in RRC idle state, the terminal may send the RRC connection request message, or directly send the data information. If the terminal is in RRC connection re-established state, the terminal may send the RRC connection re-establishment request message, or directly send the data information and the buffer status report.

A first receiving unit 804 is configured to receive downlink information sent by the base station. The downlink information includes an uplink timing adjustment command and a positive acknowledgment of the first uplink information. When the radio resource control RRC connection to the base station is in connected state, the downlink information further includes a synchronization uplink grant message and/or identification information of the terminal. Alternatively, when the radio resource control RRC connection to the base station is in idle state, the downlink information further includes an RRC connection establishment message. Alternatively, when the radio resource control RRC connection to the base station is re-established, the downlink information further includes a synchronization uplink grant message and/or an RRC connection re-establishment message.

Generally, an adjustment value in the uplink timing adjustment command is determined according to a deviation value between a time at which the base station receives the first uplink information and a receive window. For example, when the base station receives the first uplink information $\Delta T$, for example, 1 μs, later than the receive window, the adjustment value added by the base station to the uplink timing adjustment command is $\Delta T$. After receiving the adjustment value, the terminal uses the value $\Delta T$ in a subsequent data transmission process. No limitation is set herein.

The base station may determine content of the downlink information according to the states of the connection to the terminal. When the base station is in RRC connected state, the base station may send the synchronization uplink grant message, to instruct the terminal to send uplink data. The terminal may further send the terminal identifier. For example, the terminal identifier is the C-RNTI (CellRadioNetworkTemporaryIdentifier, cell radio network temporary identifier). It should be noted that, when the asynchronous transmission parameters are used by the terminal alone, the identifier does not need to be carried. If the base station is in RRC idle state, the base station may send the RRC connection establishment message, to instruct the terminal to establish an RRC connection to the base station. If the base station is in RRC connection re-established state, the base station may send the RRC connection re-establishment message, to instruct the terminal to re-establish the RRC connection to the base station, and may further send the synchronization uplink grant message, to instruct the terminal to send uplink data.

Optionally, the downlink information is masked by using an A-PUSCH-RNTI (Asynchronous Physical Uplink Shared Channel Radio Network Temporary Identifier, asynchronous physical uplink shared channel radio network temporary identifier) or a C-RNTI (CellRadioNetworkTemporaryIdentifier, cell radio network temporary identifier). Specifically, when the UE adds the C-RNTI to the uplink information, the downlink information may be masked by using the C-RNTI. When the UE adds the A-PUSCH-RNTI to the uplink information, the downlink information may be masked by using the A-PUSCH-RNTI.

Alternatively, the downlink information includes a negative acknowledgment of the first uplink information. After the terminal receives the downlink information including the negative acknowledgment of the first uplink information, the terminal initiates a random access process, or retransmits the first uplink information by using a new asynchronous transmission frame. Details are not described herein.

A first applying unit 805 is configured to, when the radio resource control RRC connection to the base station is in connected state, apply a timing adjustment command, and start a timing adjustment timer.

A second sending unit 806 is configured to send second uplink information to the base station according to the synchronization uplink grant message, where the second uplink information includes the data information; or when the radio resource control RRC connection to the base station is in idle state, send second uplink information to the base station according to the RRC connection establishment message, where the second uplink information includes an RRC connection establishment complete message; or when the radio resource control RRC connection to the base station is in re-established state, send second uplink information to the base station according to the RRC connection re-establishment message, where the second uplink information includes an RRC connection re-establishment complete message and the data information.

According to different states of the connection to the base station, the terminal sends second uplink information including different content to the base station. It should be noted that, when the RRC connection between the terminal and the base station is not in connected state, for a subsequent information exchange step after RRC connection establishment is completed, refer to the terminal in connected state of the RRC connection to the base station. Details are not described herein.

In this embodiment of the present invention, asynchronous transmission parameter information includes information about a condition of transmitting data by using a physical resource, so that accuracy of uplink information received by a base station is improved. The asynchronous transmission parameter information further includes period information, so that a channel resource is saved. For data information that meets the condition of transmitting data by using the physical resource, first uplink information is sent to the base station by using the data transmission portion, so that interference to data of another terminal in close time may be avoided. The terminal may determine content of the first uplink information according to different states of an RRC connection to the base station, so that information exchange efficiency is improved.

Figure 3:
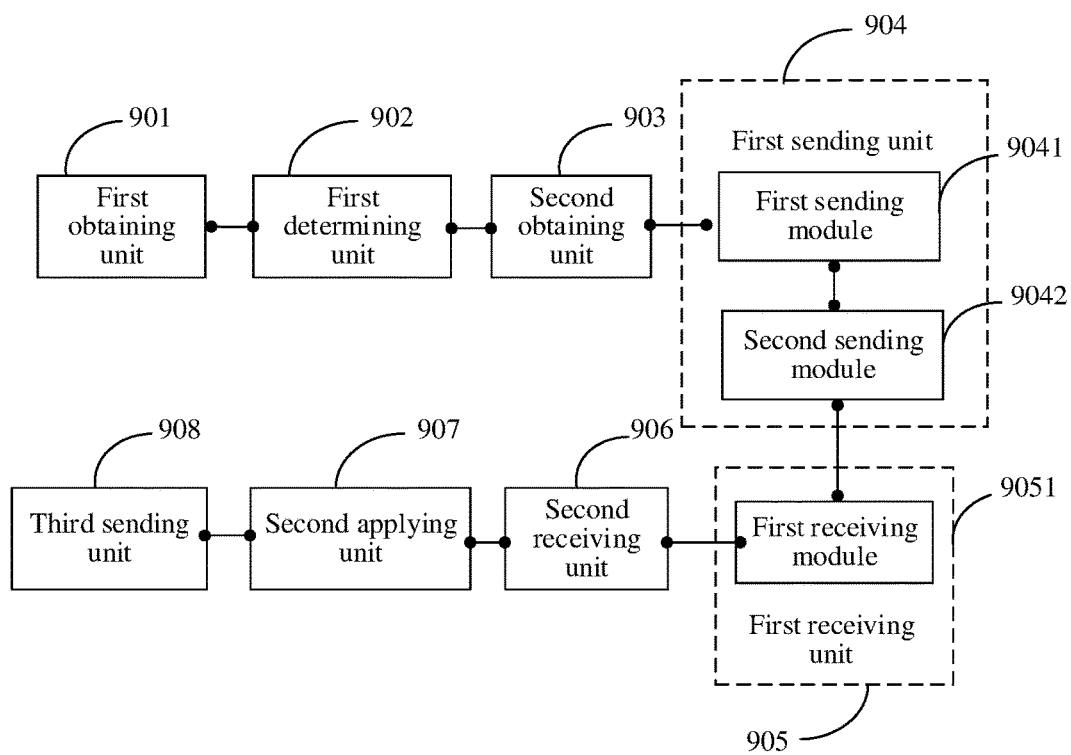
FIG. 3 is a schematic diagram of another embodiment of a terminal for asynchronous uplink transmission according to an embodiment of the present invention.

As described in the foregoing embodiment, the terminal sends the first uplink information to the base station according to the asynchronous transmission parameter information by using the asynchronous transmission frame. In an actual application, the asynchronous transmission frame may further include a physical random access channel PARCH resource portion, used to transmit a preamble. Alternatively, when the asynchronous transmission frame is sent, a physical random access channel PARCH resource is also sent. The PARCH resource is used to transmit a preamble. A specific description is provided below. Referring to FIG. 3, another embodiment of a terminal according to an embodiment of the present invention includes the following units.

A first obtaining unit 901 is configured to obtain asynchronous transmission parameter information that is the same as that of a base station. The asynchronous transmission parameter information includes physical resource information, modulation and coding scheme information, and physical resource frame format information, and the physical resource frame format information includes length information of a physical resource frame. The asynchronous transmission parameter information further includes information about a condition of transmitting data by using a physical resource and period information. The length information of the physical resource frame includes length information of at least one of a frame header portion, a data transmission portion, or a frame tail portion and/or total length information of the physical resource frame.

After determining asynchronous transmission parameters according to a requirement, the base station first sends the asynchronous transmission parameter information to the terminal. Alternatively, the terminal may obtain, in another manner, for example, protocol configuration, the asynchronous transmission parameter information that is the same as that of the base station. To implement signaling exchange, the asynchronous transmission parameters need to include the physical resource information and the modulation and coding scheme information. The physical resource is a time-frequency domain resource, and may be a PRB (physical resource block, physical resource block) location in an LTE (Long Term Evolution, Long Term Evolution) system. A modulation and coding scheme may be QPSK (Quadrature Phase Shift Keying, quadrature phase shift keying) or 1/2 coding or the like. To implement asynchronous transmission, the asynchronous transmission parameters further need to include the length information of the physical resource frame. To improve accuracy of uplink information received by the base station, the asynchronous transmission parameter information may further include the information about the condition of transmitting data by using the physical resource, that is, which radio bearer data may be transmitted on the physical resource. To save a channel resource, the asynchronous transmission parameter information further includes the period information, used to indicate a period used by the base station to send the physical resource, that is, how often the physical resource may be sent, or a how many times the physical resource may be sent. Length information of any portion of the physical resource frame and/or the total length information of the physical resource frame may be set according to an actual requirement, so that a length of an asynchronous transmission frame that is configured according to the physical resource frame is a length of a frame whose reception is allowed by the base station. The asynchronous transmission parameter information may further include an identifier associated with the physical resource. No limitation is set herein.

A method for determining asynchronous data transmission parameters by the base station may be implemented as follows. The parameters are semi-statically configured by using an RRC message, for example, a broadcast message or a dedicated RRC message. Alternatively, the parameters are dynamically configured by using a MAC layer or physical layer message, for example, a MAC CE or PDCCH signaling. Alternatively, the parameters are configured by using an RRC message and a MAC layer or physical layer message. Some parameters are notified by using the RRC message, and the other messages are notified by using the MAC layer or physical layer message. Alternatively, some parameters, for example, the length information of the physical resource frame, are fixed by using a protocol, and the other parameters are notified to the terminal in the foregoing manner. Optionally, the asynchronous transmission parameters may be sent to the terminal by using one or more messages. The asynchronous transmission parameters may be used by one terminal alone, or shared by multiple terminals. No limitation is set herein.

A first determining unit 902 is configured to determine an asynchronous transmission frame according to the physical resource frame format information. The asynchronous transmission frame includes a frame header portion, a data transmission portion, and a frame tail portion. The asynchronous transmission frame further includes a physical random access channel PRACH resource portion.

The terminal configures the asynchronous transmission frame according to the length information of the physical resource frame. The length of the asynchronous transmission frame is a length required by asynchronous transmission between the terminal and the base station. Optionally, multiple asynchronous transmission frame formats may be further pre-configured. Each asynchronous transmission frame format corresponds to an identifier. The length information of the physical resource frame in the asynchronous transmission parameter information may also be an identifier. The terminal determines a specific used asynchronous transmission frame format according to the identifier, to determine the length of the asynchronous transmission frame.

A second obtaining unit 903 is configured to obtain a preamble.

The preamble may be obtained by the terminal from reserved preamble space, or may be allocated by the base station to the terminal. No limitation is set herein.

The first sending unit 904 further includes a first sending module 9041, configured to send, for data information that meets the condition of transmitting data by using the physical resource, first uplink information to the base station by using the data transmission portion of the asynchronous transmission frame. When a radio resource control RRC connection to the base station is in connected state, the first uplink information includes at least one of a buffer status report, the data information, or a terminal identifier. Alternatively, when a radio resource control RRC connection to the base station is in idle state, the first uplink information includes at least one of an RRC connection request message, the data information, or a terminal identifier. Alternatively, when a radio resource control RRC connection to the base station is re-established, the first uplink information includes at least one of an RRC connection re-establishment request message, the data information, a buffer status report, or a terminal identifier.

The first sending unit 904 further includes a second sending module 9042, configured to send the preamble to the base station by using the PRACH resource portion.

Because the terminal sends the first uplink information to the base station according to the necessary asynchronous transmission parameter information by using the asynchronous transmission frame having the required length, the base station receives the asynchronous transmission frame, and may obtain the first uplink information. It should be noted that, when the terminal sends the first uplink information to the base station by using the asynchronous transmission frame, a used timing advance is 0. That is, the terminal determines a timing for receiving a downlink signal, uses the determined timing for receiving a downlink signal as a reference, and sends the first uplink information to the base station by using the asynchronous transmission frame. Transmitting, by using the data transmission portion, the data information that meets the condition of transmitting data by using the physical resource may avoid causing interference to data of another terminal in close time. The terminal may determine content of the first uplink information according to different states of the RRC connection to the base station. If the terminal is in RRC connected state, the terminal may directly send the buffer status report, to indicate a volume of data of the terminal that requires uplink transmission, and may further directly perform uplink transmission on the data information and the terminal identifier. For example, the terminal identifier is a C-RNTI (CellRadioNetworkTemporaryIdentifier, cell radio network temporary identifier). It should be noted that, when the asynchronous transmission parameters are used by the terminal alone, the identifier does not need to be carried. If the terminal is in RRC idle state, the terminal may send the RRC connection request message, or directly send the data information. If the terminal is in RRC connection re-established state, the terminal may send the RRC connection re-establishment request message, or directly send the data information and the buffer status report. The terminal sends the preamble to the base station, so that when the terminal fails to establish the connection to the base station, the terminal can still establish the connection by means of contention-based random access or non-contention-based random access.

A first receiving unit 905 further includes a first receiving module 9051, configured to receive downlink information sent by the base station. The downlink information includes a negative acknowledgment of the first uplink information.

When the base station fails to receive the first uplink information sent by the terminal, or fails to successfully parse out content of the first uplink information, the base station sends the downlink information to the terminal. The downlink information includes the negative acknowledgment of the first uplink information. It should be noted that the first receiving module 9051 is an optional module, because the base station may directly send a random access response message to the terminal when failing to receive the first uplink information sent by the terminal.

A second receiving unit 906 is configured to receive a random access response message sent by the base station. The random access response message includes a synchronization uplink grant message and uplink timing advance information.

When the base station fails to receive the first uplink information sent by the terminal, because the terminal sends the preamble to the base station, the base station may further send the random access response message to the terminal. The random access message includes the synchronization uplink grant message, used to indicate that the terminal may send the buffer status report or uplink data. The uplink timing advance information included in the random access message is used to indicate a time at which the terminal sends uplink information.

It should be noted that, generally, when the terminal receives the downlink information including the positive acknowledgment in the foregoing embodiment, it indicates that the base station successfully receives the first uplink information. Therefore, the base station generally does not send the random access response message, and the terminal does not receive the random access response message nor applies random access response message for uplink sending. When the terminal receives the downlink information including the negative acknowledgment of the first uplink information, it indicates that the base station fails to receive the first uplink information. Therefore, if the base station successfully receives the preamble, the base station generally sends the random access response message, and the terminal performs a subsequent operation according to the random access response message.

A second applying unit 907 is configured to apply the random access response message.

A third sending unit 908 is configured to send second uplink information to the base station. The second uplink information includes the data information.

After receiving the random access response message, the terminal may establish the connection by means of contention-based random access or non-contention-based random access, and then perform synchronized uplink transmission. No limitation is set herein.

Optionally, content in the second uplink information may be the same as or different from that in the first uplink information. That is, the terminal may retransmit, by using the second uplink information, the first uplink information that is not successfully transmitted by using the asynchronous transmission frame. No limitation is set herein.

In this embodiment of the present invention, an asynchronous transmission frame further includes a physical random access channel PRACH resource portion, used to transmit a preamble. When a base station receives the asynchronous transmission frame, if failing to parse out a data transmission portion of the asynchronous transmission frame, the base station may further obtain the preamble in the PRACH resource, and then send a random access response message to the terminal to establish an RRC connection, so that the terminal may perform synchronized uplink transmission. Information exchange stability is improved.

Figure 4:
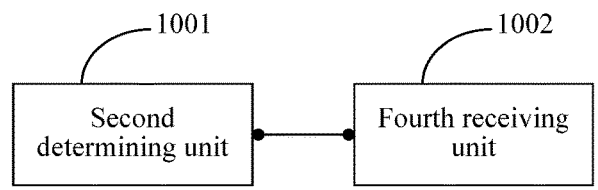
FIG. 4 is a schematic diagram of an embodiment of a base station for asynchronous uplink transmission according to an embodiment of the present invention.

Referring to FIG. 4, an embodiment of a base station according to an embodiment of the present invention includes the following units.

A second determining unit 1001 is configured to determine asynchronous transmission parameter information, where the asynchronous transmission parameter information includes physical resource information, modulation and coding scheme information, and physical resource frame format information, and the physical resource frame format information includes length information of a physical resource frame.

After determining asynchronous transmission parameters according to a requirement, the base station first sends the asynchronous transmission parameter information to a terminal. Alternatively, the terminal may obtain, in another manner, for example, protocol configuration, the asynchronous transmission parameter information that is the same as that of the base station. To implement signaling exchange, the asynchronous transmission parameters need to include the physical resource information and the modulation and coding scheme information. To implement asynchronous transmission, the asynchronous transmission parameters further need to include the length information of the physical resource frame.

A fourth receiving unit 1002 is configured to receive first uplink information that is sent by the terminal according to the asynchronous transmission parameters by using an asynchronous transmission frame. The asynchronous transmission frame includes a frame header portion, a data transmission portion, and a frame tail portion.

The terminal configures the asynchronous transmission frame according to the length information of the physical resource frame. The length of the asynchronous transmission frame is a length required by asynchronous transmission between the terminal and the base station.

Because the terminal sends the first uplink information to the base station according to the necessary asynchronous transmission parameter information by using the asynchronous transmission frame having the required length, the base station receives the asynchronous transmission frame, and may obtain the first uplink information. It should be noted that, when the terminal sends the first uplink information to the base station by using the asynchronous transmission frame, a used timing advance is 0. That is, the terminal determines a timing for receiving a downlink signal, uses the determined timing for receiving a downlink signal as a reference, and sends the first uplink information to the base station by using the asynchronous transmission frame.

In this embodiment of the present invention, an asynchronous transmission frame sent by a terminal to the base station has a length of a frame whose reception is allowed by the base station. Therefore, the base station can receive the asynchronous transmission frame, and the base station parses out content of the asynchronous transmission frame, to obtain the first uplink information. In this way, even though the terminal and the base station are in out-of-synchronization state, the terminal can still perform uplink data transmission in time. An uplink data transmission latency and signaling overheads in out-of-synchronization state are reduced.

As described in the foregoing embodiment, a base station determines asynchronous transmission parameter information. The asynchronous transmission parameter information includes physical resource information, modulation and coding scheme information, and length information of a physical resource frame. The base station receives first uplink information that is sent by a terminal according to the asynchronous transmission parameters by using an asynchronous transmission frame. The asynchronous transmission frame includes a frame header portion, a data transmission portion, and a frame tail portion. In an actual application, specific content of the first uplink information may be determined according to a state of a connection between the terminal and the base station. The asynchronous transmission parameter information further includes information about a condition of transmitting data by using a physical resource. The length information of the physical resource may be a specific portion of the physical frame. The asynchronous transmission parameters may further include period information. The base station may further send downlink information to the terminal, and receives second uplink information sent by the terminal. A specific description is provided below. Referring to FIG. 4, another embodiment of a base station according to an embodiment of the present invention includes the following units.

A second determining unit 1101 is configured to determine asynchronous transmission parameter information. The asynchronous transmission parameter information includes physical resource information, modulation and coding scheme information, and physical resource frame format information, and the physical resource frame format information includes length information of a physical resource frame. The asynchronous transmission parameter information further includes information about a condition of transmitting data by using a physical resource and period information. The length information of the physical resource frame includes length information of at least one of a frame header portion, a data transmission portion, or a frame tail portion and/or total length information of the physical resource frame.

After determining asynchronous transmission parameters according to a requirement, the base station first sends the asynchronous transmission parameter information to a terminal. Alternatively, the terminal may obtain, in another manner, for example, protocol configuration, the asynchronous transmission parameter information that is the same as that of the base station. To implement signaling exchange, the asynchronous transmission parameters need to include the physical resource information and the modulation and coding scheme information. The physical resource is a time-frequency domain resource, and may be a PRB (physical resource block, physical resource block) location in an LTE (Long Term Evolution, Long Term Evolution) system. A modulation and coding scheme may be QPSK (Quadrature Phase Shift Keying, quadrature phase shift keying) or 1/2 coding or the like. To implement asynchronous transmission, the asynchronous transmission parameters further need to include the length information of the physical resource frame. To improve accuracy of uplink information received by the base station, the asynchronous transmission parameter information may further include the information about the condition of transmitting data by using the physical resource, that is, which radio bearer data may be transmitted on the physical resource. To save a channel resource, the asynchronous transmission parameter information further includes the period information, used to indicate a period used by the base station to send the physical resource, that is, how often the physical resource may be sent, or a how many times the physical resource may be sent. Length information of any portion of the physical resource frame and/or the total length information of the physical resource frame may be set according to an actual requirement, so that a length of an asynchronous transmission frame that is configured according to the physical resource frame is a length of a frame whose reception is allowed by the base station. The asynchronous transmission parameter information may further include an identifier associated with the physical resource. No limitation is set herein.

A method for determining asynchronous data transmission parameters by the base station may be implemented as follows. The parameters are semi-statically configured by using an RRC message, for example, a broadcast message or a dedicated RRC message. Alternatively, the parameters are dynamically configured by using a MAC layer or physical layer message, for example, a MAC CE or PDCCH signaling. Alternatively, the parameters are configured by using an RRC message and a MAC layer or physical layer message. Some parameters are notified by using the RRC message, and the other messages are notified by using the MAC layer or physical layer message. Alternatively, some parameters, for example, the length information of the physical resource frame, are fixed by using a protocol, and the other parameters are notified to the terminal in the foregoing manner. Optionally, the asynchronous transmission parameters may be sent to the terminal by using one or more messages. The asynchronous transmission parameters may be used by one terminal alone, or shared by multiple terminals. No limitation is set herein.

A fourth receiving unit 1102 includes a fourth receiving module 11021, configured to receive first uplink information that is sent, for data information that meets the condition of transmitting data by using the physical resource, by using a data transmission portion of the asynchronous transmission frame. The asynchronous transmission frame includes a frame header portion, the data transmission portion, and a frame tail portion. When a radio resource control RRC connection to the base station is in connected state, the first uplink information includes at least one of a buffer status report, the data information, or a terminal identifier. Alternatively, when a radio resource control RRC connection to the base station is in idle state, the first uplink information includes at least one of an RRC connection request message, the data information, or a terminal identifier. Alternatively, when a radio resource control RRC connection to the base station is re-established, the first uplink information includes at least one of an RRC connection re-establishment request message, the data information, a buffer status report, or a terminal identifier.

The terminal configures the asynchronous transmission frame according to the length information of the physical resource frame. The length of the asynchronous transmission frame is a length required by asynchronous transmission between the terminal and the base station. Optionally, multiple asynchronous transmission frame formats may be further pre-configured. Each asynchronous transmission frame format corresponds to an identifier. The length information of the physical resource frame in the asynchronous transmission parameter information may also be an identifier. The terminal determines a specific used asynchronous transmission frame format according to the identifier, to determine the length of the asynchronous transmission frame.

Because the terminal sends the first uplink information to the base station according to the necessary asynchronous transmission parameter information by using the asynchronous transmission frame having the required length, the base station receives the asynchronous transmission frame, and may obtain the first uplink information. It should be noted that, when the terminal sends the first uplink information to the base station by using the asynchronous transmission frame, a used timing advance is 0. That is, the terminal determines a timing for receiving a downlink signal, uses the determined timing for receiving a downlink signal as a reference, and sends the first uplink information to the base station by using the asynchronous transmission frame. Transmitting, by using the data transmission portion, the data information that meets the condition of transmitting data by using the physical resource may avoid causing interference to data of another terminal in close time. The terminal may determine content of the first uplink information according to different states of the RRC connection to the base station. If the terminal is in RRC connected state, the terminal may directly send the buffer status report, to indicate a volume of data of the terminal that requires uplink transmission, and may further directly perform uplink transmission on the data information and the terminal identifier. For example, the terminal identifier is a C-RNTI (CellRadioNetworkTemporaryIdentifier, cell radio network temporary identifier). It should be noted that, when the asynchronous transmission parameters are used by the terminal alone, the identifier does not need to be carried. If the terminal is in RRC idle state, the terminal may send the RRC connection request message, or directly send the data information. If the terminal is in RRC connection re-established state, the terminal may send the RRC connection re-establishment request message, or directly send the data information and the buffer status report.

A fifth sending unit 1103 is configured to send downlink information to the terminal. The downlink information includes an uplink timing adjustment command and a positive acknowledgment of the first uplink information. When the radio resource control RRC connection to the terminal is in connected state, the downlink information further includes a synchronization uplink grant message and/or identification information of the terminal. Alternatively, when the radio resource control RRC connection to the terminal is in idle state, the downlink information further includes an RRC connection establishment message. Alternatively, when the radio resource control RRC connection to the terminal is re-established, the downlink information further includes a synchronization uplink grant message and/or an RRC connection re-establishment message.

Generally, an adjustment value in the uplink timing adjustment command is determined according to a deviation value between a time at which the base station receives the first uplink information and a receive window. For example, when the base station receives the first uplink information $\Delta T$, for example, 1 µs, later than the receive window, the adjustment value added by the base station to the uplink timing adjustment command is $\Delta T$. After receiving the adjustment value, the terminal uses the value $\Delta T$ in a subsequent data transmission process. No limitation is set herein.

The base station may determine content of the downlink information according to the states of the connection to the terminal. When the base station is in RRC connected state, the base station may send the synchronization uplink grant message, to instruct the terminal to send uplink data. The terminal may further send the terminal identifier. For example, the terminal identifier is the C-RNTI (CellRadioNetworkTemporaryIdentifier, cell radio network temporary identifier). It should be noted that, when the asynchronous transmission parameters are used by the terminal alone, the identifier does not need to be carried. If the base station is in RRC idle state, the base station may send the RRC connection establishment message, to instruct the terminal to establish an RRC connection to the base station. If the base station is in RRC connection re-established state, the base station may send the RRC connection re-establishment message, to instruct the terminal to re-establish the RRC connection to the base station, and may further send the synchronization uplink grant message, to instruct the terminal to send uplink data.

Optionally, the downlink information is masked by using an A-PUSCH-RNTI (Asynchronous Physical Uplink Shared Channel Radio Network Temporary Identifier, asynchronous physical uplink shared channel radio network temporary identifier) or a C-RNTI (CellRadioNetworkTemporaryIdentifier, cell radio network temporary identifier). Specifically, when the UE adds the C-RNTI to the uplink information, the downlink information may be masked by using the C-RNTI. When the UE adds the A-PUSCH-RNTI to the uplink information, the downlink information may be masked by using the A-PUSCH-RNTI.

Alternatively, the downlink information includes a negative acknowledgment of the first uplink information. After the terminal receives the downlink information including the negative acknowledgment of the first uplink information, the terminal initiates a random access process, or retransmits the first uplink information by using a new asynchronous transmission frame. Details are not described herein.

A fifth receiving unit 1104 is configured to, when the radio resource control RRC connection between the terminal and the base station is in connected state, receive second uplink information that is sent by the terminal according to the synchronization uplink grant message, where the second uplink information includes the data information; or when the radio resource control RRC connection between the terminal and the base station is in idle state, receive second uplink information that is sent by the terminal according to the RRC connection establishment message, where the second uplink information includes an RRC connection establishment complete message; or when the radio resource control RRC connection between the terminal and the base station is re-established, receive second uplink information that is sent by the terminal according to the RRC connection re-establishment message, where the second uplink information includes an RRC connection re-establishment complete message and/or the data information.

According to different states of the connection to the base station, the terminal sends second uplink information including different content to the base station. It should be noted that, when the RRC connection between the terminal and the base station is not in connected state, for a subsequent information exchange step after RRC connection establishment is completed, refer to the terminal in connected state of the RRC connection to the base station. Details are not described herein.

In this embodiment of the present invention, asynchronous transmission parameter information includes information about a condition of transmitting data by using a physical resource, so that accuracy of uplink information received by the base station is improved. The asynchronous transmission parameter information further includes period information, so that a channel resource is saved. For data information that meets the condition of transmitting data by using the physical resource, first uplink information is sent to the base station by using the data transmission portion, so that interference to data of another terminal in close time may be avoided. A terminal may determine content of the first uplink information according to different states of an RRC connection to the base station, so that information exchange efficiency is improved.

Figure 5:
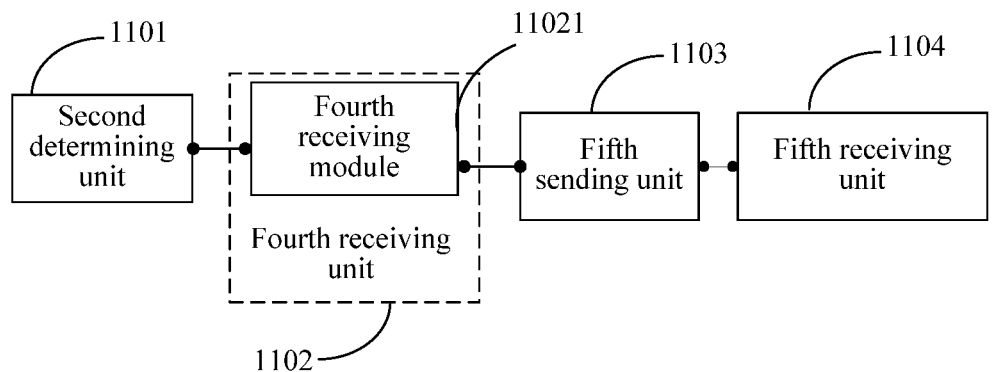
FIG. 5 is a schematic diagram of another embodiment of a base station for asynchronous uplink transmission according to an embodiment of the present invention.

As described in the foregoing embodiment, the base station receives the first uplink information that is sent by the terminal according to the asynchronous transmission parameter information by using the asynchronous transmission frame. In an actual application, the asynchronous transmission frame may further include a physical random access channel PARCH resource portion, used to transmit a preamble. Alternatively, when the asynchronous transmission frame is sent, a physical random access channel PARCH resource is also sent. The PARCH resource is used to transmit a preamble. A specific description is provided below. Referring to FIG. 5, another embodiment of a base station according to an embodiment of the present invention includes the following units.

A second determining unit 1201 is configured to determine asynchronous transmission parameter information. The asynchronous transmission parameter information includes physical resource information, modulation and coding scheme information, and physical resource frame format information, and the physical resource frame format information includes length information of a physical resource frame. The asynchronous transmission parameter information further includes information about a condition of transmitting data by using a physical resource in the asynchronous transmission frame and period information. The length information of the physical resource frame includes length information of at least one of a frame header portion, a data transmission portion, or a frame tail portion and/or total length information of the physical resource frame.

After determining asynchronous transmission parameters according to a requirement, the base station first sends the asynchronous transmission parameter information to a terminal. Alternatively, the terminal may obtain, in another manner, for example, protocol configuration, the asynchronous transmission parameter information that is the same as that of the base station. To implement signaling exchange, the asynchronous transmission parameters need to include the physical resource information and the modulation and coding scheme information. The physical resource is a time-frequency domain resource, and may be a PRB (physical resource block, physical resource block) location in an LTE (Long Term Evolution, Long Term Evolution) system. A modulation and coding scheme may be QPSK (Quadrature Phase Shift Keying, quadrature phase shift keying) or 1/2 coding or the like. To implement asynchronous transmission, the asynchronous transmission parameters further need to include the length information of the physical resource frame. To improve accuracy of uplink information received by the base station, the asynchronous transmission parameter information may further include the information about the condition of transmitting data by using the physical resource, that is, which radio bearer data may be transmitted on the physical resource. To save a channel resource, the asynchronous transmission parameter information further includes the period information, used to indicate a period used by the base station to send the physical resource, that is, how often the physical resource may be sent, or a how many times the physical resource may be sent. Length information of any portion of the physical resource frame and/or the total length information of the physical resource frame may be set according to an actual requirement, so that a length of an asynchronous transmission frame that is configured according to the physical resource frame is a length of a frame whose reception is allowed by the base station. The asynchronous transmission parameter information may further include an identifier associated with the physical resource. No limitation is set herein.

A method for determining asynchronous data transmission parameters by the base station may be implemented as follows. The parameters are semi-statically configured by using an RRC message, for example, a broadcast message or a dedicated RRC message. Alternatively, the parameters are dynamically configured by using a MAC layer or physical layer message, for example, a MAC CE or PDCCH signaling. Alternatively, the parameters are configured by using an RRC message and a MAC layer or physical layer message. Some parameters are notified by using the RRC message, and the other messages are notified by using the MAC layer or physical layer message. Alternatively, some parameters, for example, the length information of the physical resource frame, are fixed by using a protocol, and the other parameters are notified to the terminal in the foregoing manner. Optionally, the asynchronous transmission parameters may be sent to the terminal by using one or more messages. The asynchronous transmission parameters may be used by one terminal alone, or shared by multiple terminals. No limitation is set herein.

A notification unit 1202 is configured to notify the terminal of the asynchronous transmission parameter information in at least one manner of sending a radio resource control RRC layer message, sending a Media Access Control layer message, sending a physical layer message, or protocol pre-configuration.

A fourth receiving unit 1203 further includes a fifth receiving module 12031, configured to receive a preamble that is sent by the terminal by using a PRACH resource portion of an asynchronous transmission frame. The asynchronous transmission frame includes a frame header portion, a data transmission portion, a frame tail portion, and the random access channel PRACH resource portion.

The terminal configures the asynchronous transmission frame according to the length information of the physical resource frame. The length of the asynchronous transmission frame is a length required by asynchronous transmission between the terminal and the base station. Optionally, multiple asynchronous transmission frame formats may be further pre-configured. Each asynchronous transmission frame format corresponds to an identifier. The length information of the physical resource frame in the asynchronous transmission parameter information may also be an identifier. The terminal determines a specific used asynchronous transmission frame format according to the identifier, to determine the length of the asynchronous transmission frame. The preamble may be obtained by the terminal from reserved preamble space, or may be allocated by the base station to the terminal. No limitation is set herein.

A fifth sending unit 1204 further includes a fifth sending module 12041, configured to send downlink information to the terminal. The downlink information includes a negative acknowledgment of the first uplink information.

When the base station fails to receive the first uplink information sent by the terminal, or fails to successfully parse out content of the first uplink information, the base station sends the downlink information to the terminal. The downlink information includes the negative acknowledgment of the first uplink information. It should be noted that the fifth sending module 1204 is an optional module, because the base station may directly send a random access response message to the terminal when failing to receive the first uplink information sent by the terminal.

A sixth sending unit 1205 is configured to send a random access response message to the terminal. The random access response message includes synchronization uplink grant information and uplink timing advance information.

When the base station fails to receive the first uplink information sent by the terminal, because the terminal sends the preamble to the base station, the base station may further send the random access response message to the terminal. The random access message includes the synchronization uplink grant message, used to indicate that the terminal may send the buffer status report or uplink data. The uplink timing advance information included in the random access message is used to indicate a time at which the terminal sends uplink information.

It should be noted that, generally, when the terminal receives the downlink information including the positive acknowledgment in the foregoing embodiment, it indicates that the base station successfully receives the first uplink information. Therefore, the base station generally does not send the random access response message, and the terminal does not receive the random access response message nor applies random access response message for uplink sending. When the terminal receives the downlink information including the negative acknowledgment of the first uplink information, it indicates that the base station fails to receive the first uplink information. Therefore, if the base station successfully receives the preamble, the base station generally sends the random access response message, and the terminal performs a subsequent operation according to the random access response message.

A sixth receiving unit 1206 is configured to receive second uplink information sent by the terminal. The second uplink information includes data information.

After receiving the random access response message, the terminal may establish the connection by means of contention-based random access or non-contention-based random access, and then perform synchronized uplink transmission. No limitation is set herein.

Optionally, content in the second uplink information may be the same as or different from that in the first uplink information. That is, the terminal may retransmit, by using the second uplink information, the first uplink information that is not successfully transmitted by using the asynchronous transmission frame. No limitation is set herein.

In this embodiment of the present invention, an asynchronous transmission frame further includes a physical random access channel PRACH resource portion, used to transmit a preamble. When the base station receives the asynchronous transmission frame, if failing to parse out a data transmission portion of the asynchronous transmission frame, the base station may further obtain the preamble in the PRACH resource, and then send a random access response message to the terminal to establish an RRC connection, so that the terminal may perform synchronized uplink transmission. Information exchange stability is improved.

It should be noted that, as described in the foregoing embodiment, the random access channel PRACH resource is in the asynchronous transmission frame. With such a method, the preamble and the asynchronous transmission frame have a same frequency band, but have different time. In an actual application, the PRACH resource may alternatively be sent as an independent frame, as long as the PRACH resource and the asynchronous transmission frame have same time. In this way, the preamble and the asynchronous transmission frame have same time, but have different frequency bands. Such an embodiment is similar to the foregoing embodiment. Details are not described herein.

Figure 7:
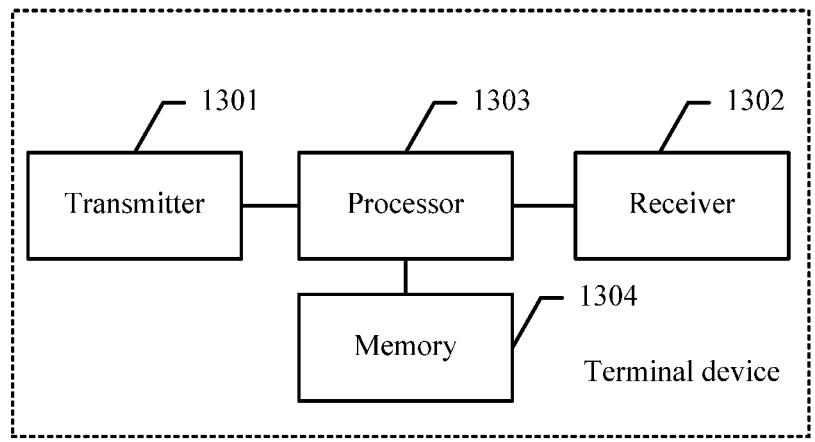
FIG. 7 is a schematic diagram of another embodiment of a terminal for asynchronous uplink transmission according to an embodiment of the present invention.

The embodiments shown in FIG. 1 to FIG. 3 describe a specific structure of an access point device from the perspective of functional units. The following describes the specific structure of the access point device from the perspective of hardware by using an embodiment shown in FIG. 7.

As shown in FIG. 13, the terminal includes a transmitter 1301, a receiver 1302, a processor 1303, and a memory 1304.

The access point device in this embodiment of the present invention may have more or less components than those shown in FIG. 13. Two or more components may be combined, or configuration or setting of the components may be different, and the components may be implemented in hardware, software, or a combination of hardware and software that includes one or more signal processing and/or application-specific integrated circuits.

The receiver 1302 is configured to obtain asynchronous transmission parameter information that is the same as that of a base station. The asynchronous transmission parameter information includes physical resource information, modulation and coding scheme information, and physical resource frame format information, and the physical resource frame format information includes length information of a physical resource frame.

The processor 1303 is configured to determine a length of an asynchronous transmission frame according to the physical resource frame format information. The asynchronous transmission frame includes a frame header portion, a data transmission portion, and a frame tail portion.

The transmitter 1301 is configured to send first uplink information to the base station according to the asynchronous transmission parameter information by using the asynchronous transmission frame.

In another embodiment, the receiver 1302 is configured to obtain asynchronous transmission parameter information that is the same as that of a base station. The asynchronous transmission parameter information includes physical resource information, modulation and coding scheme information, and physical resource frame format information, and the physical resource frame format information includes length information of a physical resource frame. The asynchronous transmission parameter information further includes information about a condition of transmitting data by using a physical resource in the asynchronous transmission frame and period information. The length information of the physical resource frame includes length information of at least one of a frame header portion, a data transmission portion, or a frame tail portion and/or total length information of the physical resource frame.

The processor 1303 is configured to determine a length of an asynchronous transmission frame according to the physical resource frame format information. The asynchronous transmission frame includes a frame header portion, a data transmission portion, and a frame tail portion.

The transmitter 1301 is configured to send, for data information that meets the condition of transmitting data by using the physical resource, first uplink information to the base station by using the data transmission portion. When a radio resource control RRC connection to the base station is in connected state, the first uplink information includes at least one of a buffer status report, the data information, or a terminal identifier. Alternatively, when a radio resource control RRC connection to the base station is in idle state, the first uplink information includes at least one of an RRC connection request message, the data information, or a terminal identifier. Alternatively, when a radio resource control RRC connection to the base station is re-established, the first uplink information includes at least one of an RRC connection re-establishment request message, the data information, a buffer status report, or a terminal identifier.

The receiver 1301 is further configured to, after the transmitter 1301 sends the first uplink information, receive downlink information sent by the base station. The downlink information includes an uplink timing adjustment command and a positive acknowledgment of the first uplink information. When the radio resource control RRC connection to the base station is in connected state, the downlink information further includes a synchronization uplink grant message and/or identification information of the terminal. Alternatively, when the radio resource control RRC connection to the base station is in idle state, the downlink information further includes an RRC connection establishment message. Alternatively, when the radio resource control RRC connection to the base station is re-established, the downlink information further includes a synchronization uplink grant message and/or an RRC connection re-establishment message.

The processor 1303 is further configured to, after the receiver 1301 receives the downlink information, when the radio resource control RRC connection to the base station is in connected state, apply a timing adjustment command, and start a timing adjustment timer.

The transmitter 1301 is further configured to, after the receiver 1301 receives the downlink information, send second uplink information to the base station according to the synchronization uplink grant message, where the second uplink information includes the data information; or when the radio resource control RRC connection to the base station is in idle state, send second uplink information to the base station according to the RRC connection establishment message, where the second uplink information includes an RRC connection establishment complete message; or when the radio resource control RRC connection to the base station is in re-established state, send second uplink information to the base station according to the RRC connection re-establishment message, where the second uplink information includes an RRC connection re-establishment complete message and the data information.

In another embodiment, the receiver 1302 is configured to obtain asynchronous transmission parameter information that is the same as that of a base station. The asynchronous transmission parameter information includes physical resource information, modulation and coding scheme information, and physical resource frame format information, and the physical resource frame format information includes length information of a physical resource frame. The asynchronous transmission parameter information further includes information about a condition of transmitting data by using a physical resource and period information. The length information of the physical resource frame includes length information of at least one of a frame header portion, a data transmission portion, or a frame tail portion and/or total length information of the physical resource frame.

The processor 1303 is configured to determine an asynchronous transmission frame according to the physical resource frame format information. The asynchronous transmission frame includes a frame header portion, a data transmission portion, and a frame tail portion. The asynchronous transmission frame further includes a physical random access channel PRACH resource portion.

The receiver 1302 is further configured to obtain a preamble.

The transmitter 1301 is configured to send, for data information that meets the condition of transmitting data by using the physical resource, first uplink information to the base station by using the data transmission portion of the asynchronous transmission frame. When a radio resource control RRC connection to the base station is in connected state, the first uplink information includes at least one of a buffer status report, the data information, or a terminal identifier. Alternatively, when a radio resource control RRC connection to the base station is in idle state, the first uplink information includes at least one of an RRC connection request message, the data information, or a terminal identifier. Alternatively, when a radio resource control RRC connection to the base station is re-established, the first uplink information includes at least one of an RRC connection re-establishment request message, the data information, a buffer status report, or a terminal identifier.

The transmitter 1301 is further configured to send the preamble to the base station by using the PRACH resource portion.

The receiver 1302 is further configured to, after the transmitter 1301 sends the first uplink information and the preamble, receive downlink information sent by the base station. The downlink information includes a negative acknowledgment of the first uplink information.

The receiver 1302 is further configured to receive a random access response message sent by the base station. The random access response message includes a synchronization uplink grant message and uplink timing advance information.

The processor 1303 is further configured to, after the receiver 1302 receives the random access response message, apply the random access response message.

The transmitter 1301 is further configured to send second uplink information to the base station. The second uplink information includes the data information.

In this embodiment, an asynchronous transmission frame sent by the transmitter 1301 to a base station has a length of a frame whose reception is allowed by the base station. Therefore, the base station can receive the asynchronous transmission frame, and the base station parses out content of the asynchronous transmission frame, to obtain the first uplink information. In this way, even though the terminal and the base station are in out-of-synchronization state, the terminal can still perform uplink data transmission in time. An uplink data transmission latency and signaling overheads in out-of-synchronization state are reduced.

Figure 6:
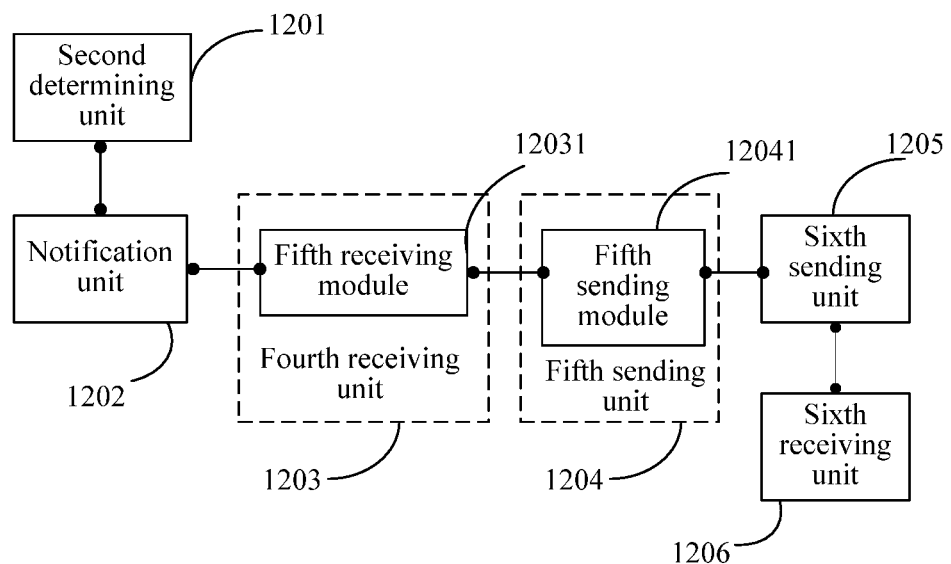
FIG. 6 is a schematic diagram of another embodiment of a base station for asynchronous uplink transmission according to an embodiment of the present invention.
Figure 8:
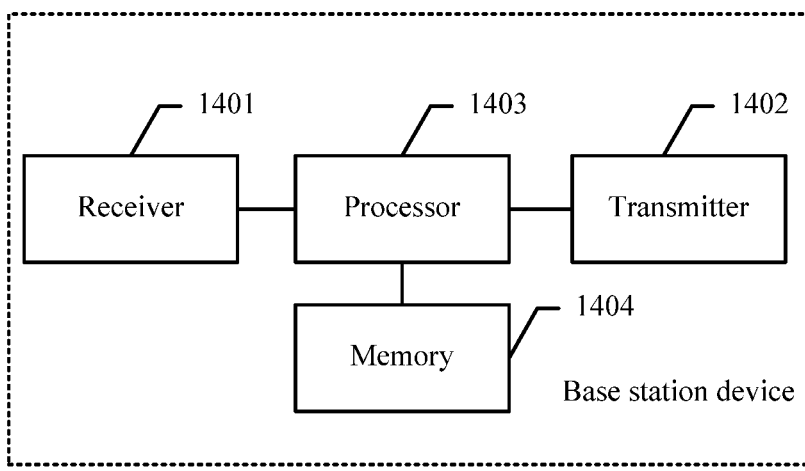
FIG. 8 is a schematic diagram of another embodiment of a base station for asynchronous uplink transmission according to an embodiment of the present invention.

The embodiments shown in FIG. 4 to FIG. 6 describe a specific structure of a base station from the perspective of functional modules. The following describes a specific structure of a station from the perspective of hardware by using an embodiment shown in FIG. 8.

Figure 14:
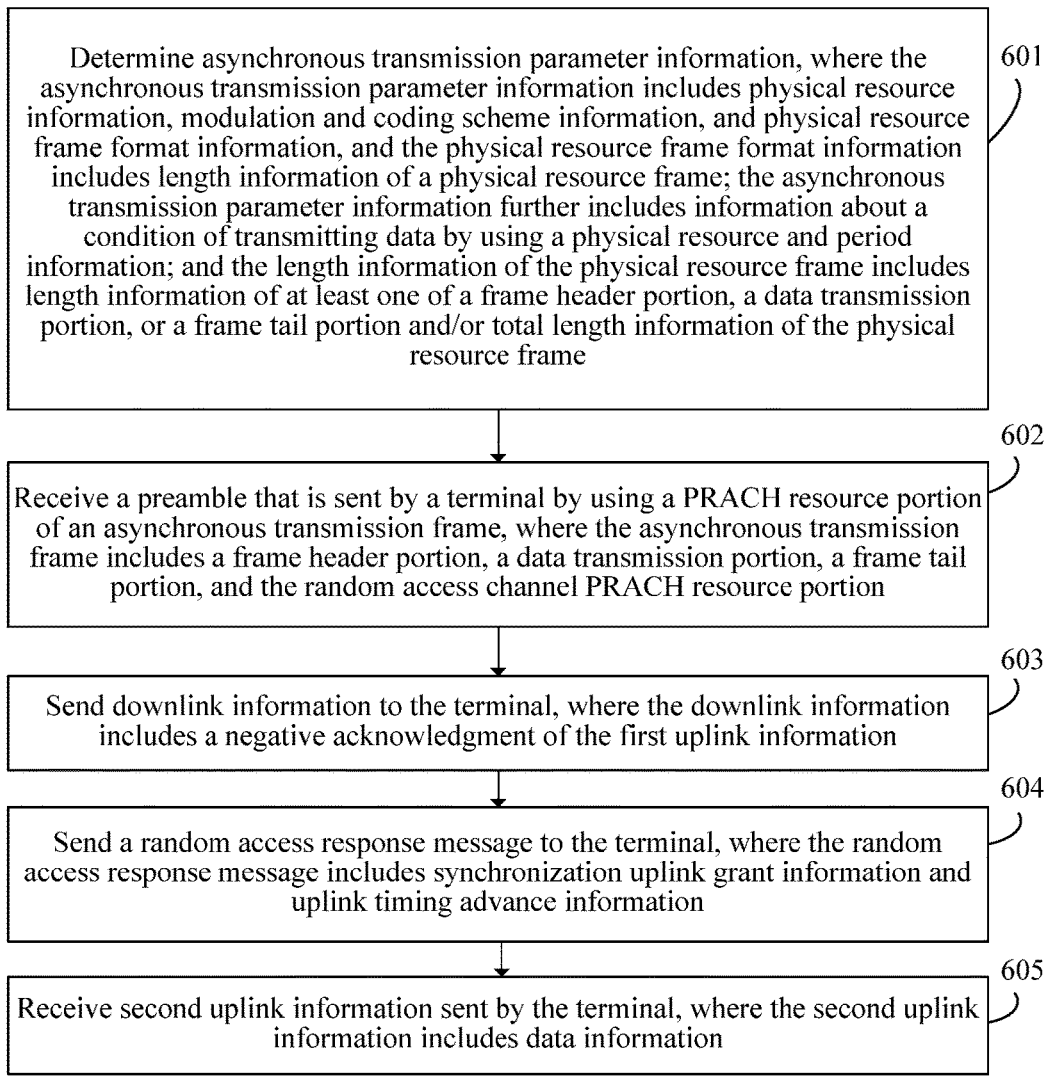
FIG. 14 is a schematic diagram of an embodiment of a method for asynchronous uplink transmission according to an embodiment of the present invention.

As shown in FIG. 14, the station device includes a receiver 1401, a transmitter 1402, a processor 1403, and a memory 1404.

The station device involved in this embodiment of the present invention may have more or less components than those shown in FIG. 14. Two or more components may be combined, or configuration or setting of the components may be different, and the components may be implemented in hardware, software, or a combination of hardware and software that includes one or more signal processing and/or application-specific integrated circuits.

The processor 1403 is configured to determine asynchronous transmission parameter information. The asynchronous transmission parameter information includes physical resource information, modulation and coding scheme information, and physical resource frame format information, and the physical resource frame format information includes length information of a physical resource frame.

The receiver 1401 is configured to receive first uplink information that is sent by a terminal according to the asynchronous transmission parameters by using an asynchronous transmission frame. The asynchronous transmission frame includes a frame header portion, a data transmission portion, and a frame tail portion.

In another embodiment, the receiver 1403 is configured to determine asynchronous transmission parameter information. The asynchronous transmission parameter information includes physical resource information, modulation and coding scheme information, and physical resource frame format information, and the physical resource frame format information includes length information of a physical resource frame. The asynchronous transmission parameter information further includes information about a condition of transmitting data by using a physical resource and period information. The length information of the physical resource frame includes length information of at least one of a frame header portion, a data transmission portion, or a frame tail portion and/or total length information of the physical resource frame.

The receiver 1401 is configured to receive first uplink information that is sent, for data information that meets the condition of transmitting data by using the physical resource, by using a data transmission portion of the asynchronous transmission frame. The asynchronous transmission frame includes a frame header portion, the data transmission portion, and a frame tail portion. When a radio resource control RRC connection to the base station is in connected state, the first uplink information includes at least one of a buffer status report, the data information, or a terminal identifier. Alternatively, when a radio resource control RRC connection to the base station is in idle state, the first uplink information includes at least one of an RRC connection request message, the data information, or a terminal identifier. Alternatively, when a radio resource control RRC connection to the base station is re-established, the first uplink information includes at least one of an RRC connection re-establishment request message, the data information, a buffer status report, or a terminal identifier.

The transmitter 1402 is configured to send downlink information to the terminal. The downlink information includes an uplink timing adjustment command and a positive acknowledgment of the first uplink information. When the radio resource control RRC connection to the terminal is in connected state, the downlink information further includes a synchronization uplink grant message and/or identification information of the terminal. Alternatively, when the radio resource control RRC connection to the terminal is in idle state, the downlink information further includes an RRC connection establishment message. Alternatively, when the radio resource control RRC connection to the terminal is re-established, the downlink information further includes a synchronization uplink grant message and/or an RRC connection re-establishment message.

The receiver 1401 is further configured to, after the transmitter 1402 sends the downlink information, when the radio resource control RRC connection between the terminal and the base station is in connected state, receive second uplink information that is sent by the terminal according to the synchronization uplink grant message, where the second uplink information includes the data information; or when the radio resource control RRC connection between the terminal and the base station is in idle state, receive second uplink information that is sent by the terminal according to the RRC connection establishment message, where the second uplink information includes an RRC connection establishment complete message; or when the radio resource control RRC connection between the terminal and the base station is re-established, receive second uplink information that is sent by the terminal according to the RRC connection re-establishment message, where the second uplink information includes an RRC connection re-establishment complete message and/or the data information.

In another embodiment, the receiver 1403 is configured to determine asynchronous transmission parameter information. The asynchronous transmission parameter information includes physical resource information, modulation and coding scheme information, and physical resource frame format information, and the physical resource frame format information includes length information of a physical resource frame. The asynchronous transmission parameter information further includes information about a condition of transmitting data by using a physical resource in the asynchronous transmission frame and period information. The length information of the physical resource frame includes length information of at least one of a frame header portion, a data transmission portion, or a frame tail portion and/or total length information of the physical resource frame.

The transmitter 1402 is configured to notify a terminal of the asynchronous transmission parameter information in at least one manner of sending a radio resource control RRC layer message, sending a Media Access Control layer message, sending a physical layer message, or protocol pre-configuration.

The receiver 1401 is further configured to receive a preamble that is sent by the terminal by using a PRACH resource portion of an asynchronous transmission frame. The asynchronous transmission frame includes a frame header portion, a data transmission portion, a frame tail portion, and the random access channel PRACH resource portion.

The transmitter 1402 is further configured to after the receiver 1401 receives the preamble, send downlink information to the terminal. The downlink information includes a negative acknowledgment of the first uplink information.

The transmitter 1402 is further configured to after the receiver 1401 receives the preamble, send a random access response message to the terminal. The random access response message includes synchronization uplink grant information and uplink timing advance information.

The receiver 1401 is further configured to, after the transmitter 1402 sends the random access response message to the terminal, receive second uplink information sent by the terminal. The second uplink information includes data information.

In this embodiment of the present invention, an asynchronous transmission frame sent by a terminal to the base station has a length of a frame whose reception is allowed by the base station. Therefore, the base station can receive the asynchronous transmission frame, and the base station parses out content of the asynchronous transmission frame, to obtain the first uplink information. In this way, even though the terminal and the base station are in out-of-synchronization state, the terminal can still perform uplink data transmission in time. An uplink data transmission latency and signaling overheads in out-of-synchronization state are reduced.

Figure 9:
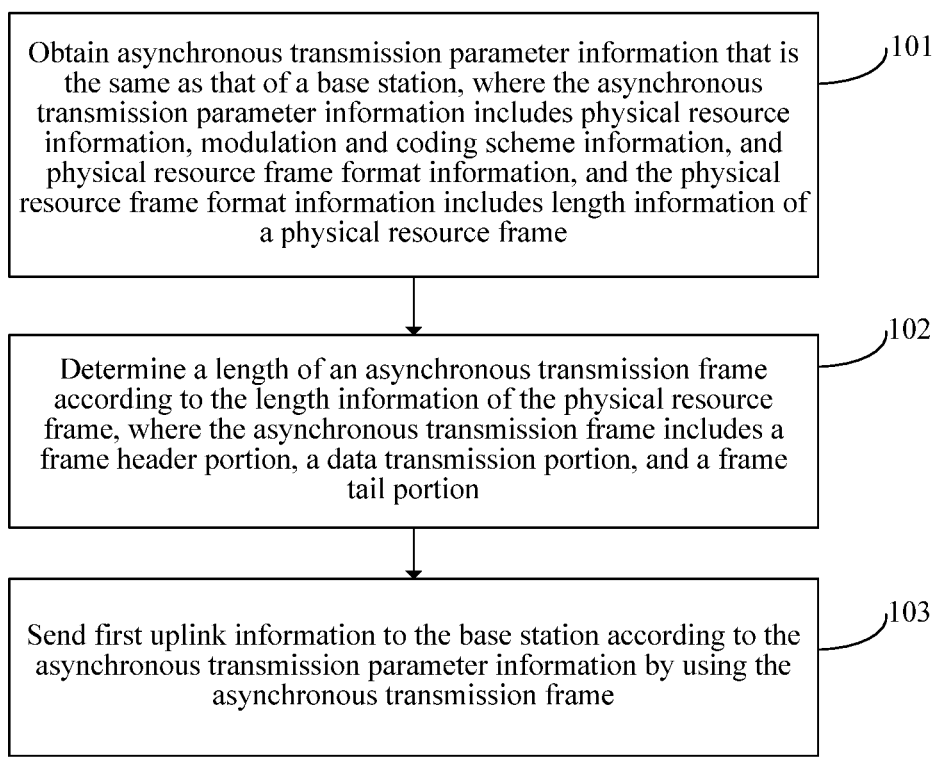
FIG. 9 is a schematic diagram of an embodiment of a method for asynchronous uplink transmission according to an embodiment of the present invention.

Referring to FIG. 9, an embodiment of a method for asynchronous uplink transmission according to an embodiment of the present invention includes the following steps.

101: Obtain asynchronous transmission parameter information that is the same as that of a base station, where the asynchronous transmission parameter information includes physical resource information, modulation and coding scheme information, and physical resource frame format information, and the physical resource frame format information includes length information of a physical resource frame.

After determining asynchronous transmission parameters according to a requirement, the base station first sends the asynchronous transmission parameter information to a terminal. Alternatively, the terminal may obtain, in another manner, for example, protocol configuration, the asynchronous transmission parameter information that is the same as that of the base station. To implement signaling exchange, the asynchronous transmission parameters need to include the physical resource information and the modulation and coding scheme information. To implement asynchronous transmission, the asynchronous transmission parameters further need to include the length information of the physical resource frame.

102: Determine a length of an asynchronous transmission frame according to the length information of the physical resource frame, where the asynchronous transmission frame includes a frame header portion, a data transmission portion, and a frame tail portion.

The terminal configures the asynchronous transmission frame according to the length information of the physical resource frame. The length of the asynchronous transmission frame is a length required by asynchronous transmission between the terminal and the base station.

103: Send first uplink information to the base station according to the asynchronous transmission parameter information by using the asynchronous transmission frame.

Because the terminal sends the first uplink information to the base station according to the necessary asynchronous transmission parameter information by using the asynchronous transmission frame having the required length, the base station receives the asynchronous transmission frame, and may obtain the first uplink information. It should be noted that, when the terminal sends the first uplink information to the base station by using the asynchronous transmission frame, a used timing advance is 0. That is, the terminal determines a timing for receiving a downlink signal, uses the determined timing for receiving a downlink signal as a reference, and sends the first uplink information to the base station by using the asynchronous transmission frame.

In this embodiment of the present invention, asynchronous transmission parameter information that is the same as that of a base station is obtained. The asynchronous transmission parameter information includes physical resource information, modulation and coding scheme information, and physical resource frame format information, and the physical resource frame format information includes length information of a physical resource frame. A length of an asynchronous transmission frame is determined according to the physical resource frame format information. First uplink information is sent to the base station according to the asynchronous transmission parameter information by using the asynchronous transmission frame. Because the asynchronous transmission parameter information obtained by a terminal is the same as that of the base station, the length of the asynchronous transmission frame that is determined by the terminal is the same as that determined by the base station. Therefore, even though in out-of-synchronization state, when the terminal sends the first uplink information to the base station according to the asynchronous transmission parameter information by using the asynchronous transmission frame, the base station can still receive the first uplink information, implementing uplink transmission on data without first establishing an RRC connection by using signaling. In this way, an uplink data transmission latency and signaling overheads in out-of-synchronization state are reduced.

Figure 10:
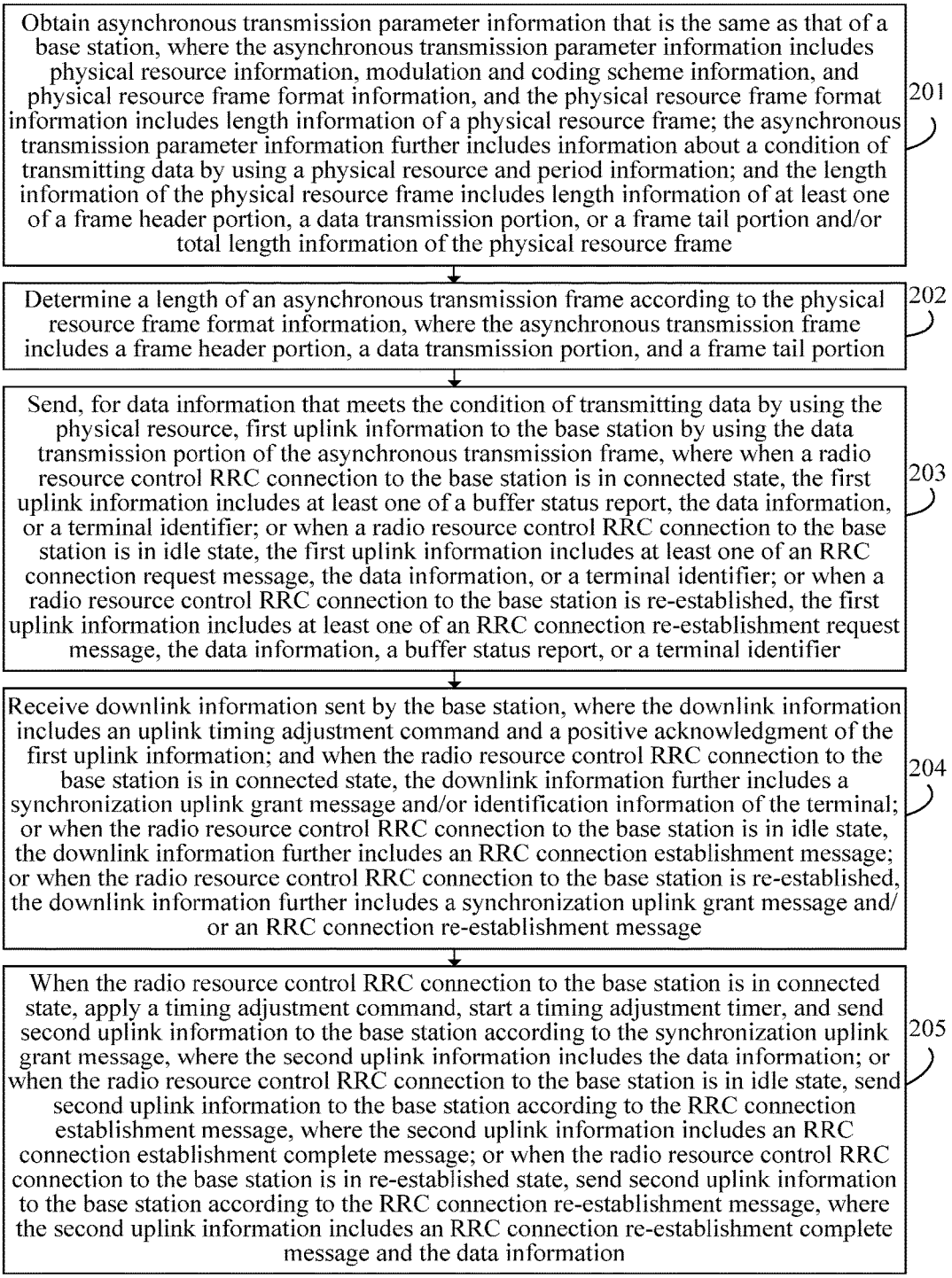
FIG. 10 is a schematic diagram of an embodiment of a method for asynchronous uplink transmission according to an embodiment of the present invention.

As described in the foregoing embodiment, a terminal receives asynchronous transmission parameter information sent by a base station. The asynchronous transmission parameter information includes physical resource information, modulation and coding scheme information, and length information of a physical resource frame. The terminal configures an asynchronous transmission frame, and sends first uplink information to the base station according to the asynchronous transmission parameter information by using the asynchronous transmission frame. In an actual application, specific content of the first uplink information may be determined according to a state of a connection between the terminal and the base station. The asynchronous transmission parameter information further includes information about a condition of transmitting data by using a physical resource. The length information of the physical resource may be a specific portion of the physical frame. The asynchronous transmission parameters may further include period information. The terminal may further receive downlink information sent by the base station, and send second uplink information to the base station. A specific description is provided below. Referring to FIG. 10, another embodiment of a method for asynchronous uplink transmission according to an embodiment of the present invention includes the following steps.

201: Obtain asynchronous transmission parameter information that is the same as that of a base station, where the asynchronous transmission parameter information includes physical resource information, modulation and coding scheme information, and physical resource frame format information, and the physical resource frame format information includes length information of a physical resource frame; the asynchronous transmission parameter information further includes information about a condition of transmitting data by using a physical resource and period information; and the length information of the physical resource frame includes length information of at least one of a frame header portion, a data transmission portion, or a frame tail portion and/or total length information of the physical resource frame.

After determining asynchronous transmission parameters according to a requirement, the base station first sends the asynchronous transmission parameter information to a terminal. Alternatively, the terminal may obtain, in another manner, for example, protocol configuration, the asynchronous transmission parameter information that is the same as that of the base station. To implement signaling exchange, the asynchronous transmission parameters need to include the physical resource information and the modulation and coding scheme information. The physical resource is a time-frequency domain resource, and may be a PRB (physical resource block, physical resource block) location in an LTE (Long Term Evolution, Long Term Evolution) system. A modulation and coding scheme may be QPSK (Quadrature Phase Shift Keying, quadrature phase shift keying) or 1/2 coding or the like. To implement asynchronous transmission, the asynchronous transmission parameters further need to include the length information of the physical resource frame. To improve accuracy of uplink information received by the base station, the asynchronous transmission parameter information may further include the information about the condition of transmitting data by using the physical resource, that is, which radio bearer data may be transmitted on the physical resource. To save a channel resource, the asynchronous transmission parameter information further includes the period information, used to indicate a period used by the base station to send the physical resource, that is, how often the physical resource may be sent, or a how many times the physical resource may be sent. Length information of any portion of the physical resource frame and/or the total length information of the physical resource frame may be set according to an actual requirement, so that a length of an asynchronous transmission frame that is configured according to the physical resource frame is a length of a frame whose reception is allowed by the base station. The asynchronous transmission parameter information may further include an identifier associated with the physical resource. No limitation is set herein.

A method for determining asynchronous data transmission parameters by the base station may be implemented as follows. The parameters are semi-statically configured by using an RRC message, for example, a broadcast message or a dedicated RRC message. Alternatively, the parameters are dynamically configured by using a MAC layer or physical layer message, for example, a MAC CE or PDCCH signaling. Alternatively, the parameters are configured by using an RRC message and a MAC layer or physical layer message. Some parameters are notified by using the RRC message, and the other messages are notified by using the MAC layer or physical layer message. Alternatively, some parameters, for example, the length information of the physical resource frame, are fixed by using a protocol, and the other parameters are notified to the terminal in the foregoing manner. Optionally, the asynchronous transmission parameters may be sent to the terminal by using one or more messages. The asynchronous transmission parameters may be used by one terminal alone, or shared by multiple terminals. No limitation is set herein.

202: Determine a length of an asynchronous transmission frame according to the physical resource frame format information, where the asynchronous transmission frame includes a frame header portion, a data transmission portion, and a frame tail portion.

The terminal configures the asynchronous transmission frame according to the length information of the physical resource frame. The length of the asynchronous transmission frame is a length required by asynchronous transmission between the terminal and the base station. Optionally, multiple asynchronous transmission frame formats may be further pre-configured. Each asynchronous transmission frame format corresponds to an identifier. The length information of the physical resource frame in the asynchronous transmission parameter information may also be an identifier. The terminal determines a specific used asynchronous transmission frame format according to the identifier, to determine the length of the asynchronous transmission frame.

203: Send, for data information that meets the condition of transmitting data by using the physical resource, first uplink information to the base station by using the data transmission portion of the asynchronous transmission frame, where when a radio resource control RRC connection to the base station is in connected state, the first uplink information includes at least one of a buffer status report, the data information, or a terminal identifier; or when a radio resource control RRC connection to the base station is in idle state, the first uplink information includes at least one of an RRC connection request message, the data information, or a terminal identifier; or when a radio resource control RRC connection to the base station is re-established, the first uplink information includes at least one of an RRC connection re-establishment request message, the data information, a buffer status report, or a terminal identifier.

Because the terminal sends the first uplink information to the base station according to the necessary asynchronous transmission parameter information by using the asynchronous transmission frame having the required length, the base station receives the asynchronous transmission frame, and may obtain the first uplink information. It should be noted that, when the terminal sends the first uplink information to the base station by using the asynchronous transmission frame, a used timing advance is 0. That is, the terminal determines a timing for receiving a downlink signal, uses the determined timing for receiving a downlink signal as a reference, and sends the first uplink information to the base station by using the asynchronous transmission frame. Transmitting, by using the data transmission portion, the data information that meets the condition of transmitting data by using the physical resource may avoid causing interference to data of another terminal in close time. The terminal may determine content of the first uplink information according to different states of the RRC connection to the base station. If the terminal is in RRC connected state, the terminal may directly send the buffer status report, to indicate a volume of data of the terminal that requires uplink transmission, and may further directly perform uplink transmission on the data information and the terminal identifier. For example, the terminal identifier is a C-RNTI (CellRadioNetworkTemporaryIdentifier, cell radio network temporary identifier). It should be noted that, when the asynchronous transmission parameters are used by the terminal alone, the identifier does not need to be carried. If the terminal is in RRC idle state, the terminal may send the RRC connection request message, or directly send the data information. If the terminal is in RRC connection re-established state, the terminal may send the RRC connection re-establishment request message, or directly send the data information and the buffer status report.

204: Receive downlink information sent by the base station, where the downlink information includes an uplink timing adjustment command and a positive acknowledgment of the first uplink information; and when the radio resource control RRC connection to the base station is in connected state, the downlink information further includes a synchronization uplink grant message and/or identification information of the terminal; or when the radio resource control RRC connection to the base station is in idle state, the downlink information further includes an RRC connection establishment message; or when the radio resource control RRC connection to the base station is re-established, the downlink information further includes a synchronization uplink grant message and/or an RRC connection re-establishment message.

Generally, an adjustment value in the uplink timing adjustment command is determined according to a deviation value between a time at which the base station receives the first uplink information and a receive window. For example, when the base station receives the first uplink information ΔT, for example, 1 μs, later than the receive window, the adjustment value added by the base station to the uplink timing adjustment command is ΔT. After receiving the adjustment value, the terminal uses the value ΔT in a subsequent data transmission process. No limitation is set herein.

The base station may determine content of the downlink information according to the states of the connection to the terminal. When the base station is in RRC connected state, the base station may send the synchronization uplink grant message, to instruct the terminal to send uplink data. The terminal may further send the terminal identifier. For example, the terminal identifier is the C-RNTI (CellRadioNetworkTemporaryIdentifier, cell radio network temporary identifier). It should be noted that, when the asynchronous transmission parameters are used by the terminal alone, the identifier does not need to be carried. If the base station is in RRC idle state, the base station may send the RRC connection establishment message, to instruct the terminal to establish an RRC connection to the base station. If the base station is in RRC connection re-established state, the base station may send the RRC connection re-establishment message, to instruct the terminal to re-establish the RRC connection to the base station, and may further send the synchronization uplink grant message, to instruct the terminal to send uplink data.

Optionally, the downlink information is masked by using an A-PUSCH-RNTI (Asynchronous Physical Uplink Shared Channel Radio Network Temporary Identifier, asynchronous physical uplink shared channel radio network temporary identifier) or a C-RNTI (CellRadioNetworkTemporaryIdentifier, cell radio network temporary identifier). Specifically, when the UE adds the C-RNTI to the uplink information, the downlink information may be masked by using the C-RNTI. When the UE adds the A-PUSCH-RNTI to the uplink information, the downlink information may be masked by using the A-PUSCH-RNTI.

Alternatively, the downlink information includes a negative acknowledgment of the first uplink information. After the terminal receives the downlink information including the negative acknowledgment of the first uplink information, the terminal initiates a random access process, or retransmits the first uplink information by using a new asynchronous transmission frame. Details are not described herein.

205: When the radio resource control RRC connection to the base station is in connected state, apply a timing adjustment command, start a timing adjustment timer, and send second uplink information to the base station according to the synchronization uplink grant message, where the second uplink information includes the data information; or when the radio resource control RRC connection to the base station is in idle state, send second uplink information to the base station according to the RRC connection establishment message, where the second uplink information includes an RRC connection establishment complete message; or when the radio resource control RRC connection to the base station is in re-established state, send second uplink information to the base station according to the RRC connection re-establishment message, where the second uplink information includes an RRC connection re-establishment complete message and the data information.

According to different states of the connection to the base station, the terminal sends second uplink information including different content to the base station. It should be noted that, when the RRC connection between the terminal and the base station is not in connected state, for a subsequent information exchange step after RRC connection establishment is completed, refer to the terminal in connected state of the RRC connection to the base station. Details are not described herein.

In this embodiment of the present invention, asynchronous transmission parameter information includes information about a condition of transmitting data by using a physical resource, so that accuracy of uplink information received by a base station is improved. The asynchronous transmission parameter information further includes period information, so that a channel resource is saved. For data information that meets the condition of transmitting data by using the physical resource, first uplink information is sent to the base station by using the data transmission portion, so that interference to data of another terminal in close time may be avoided. A terminal may determine content of the first uplink information according to different states of an RRC connection to the base station, so that information exchange efficiency is improved.

Figure 11:
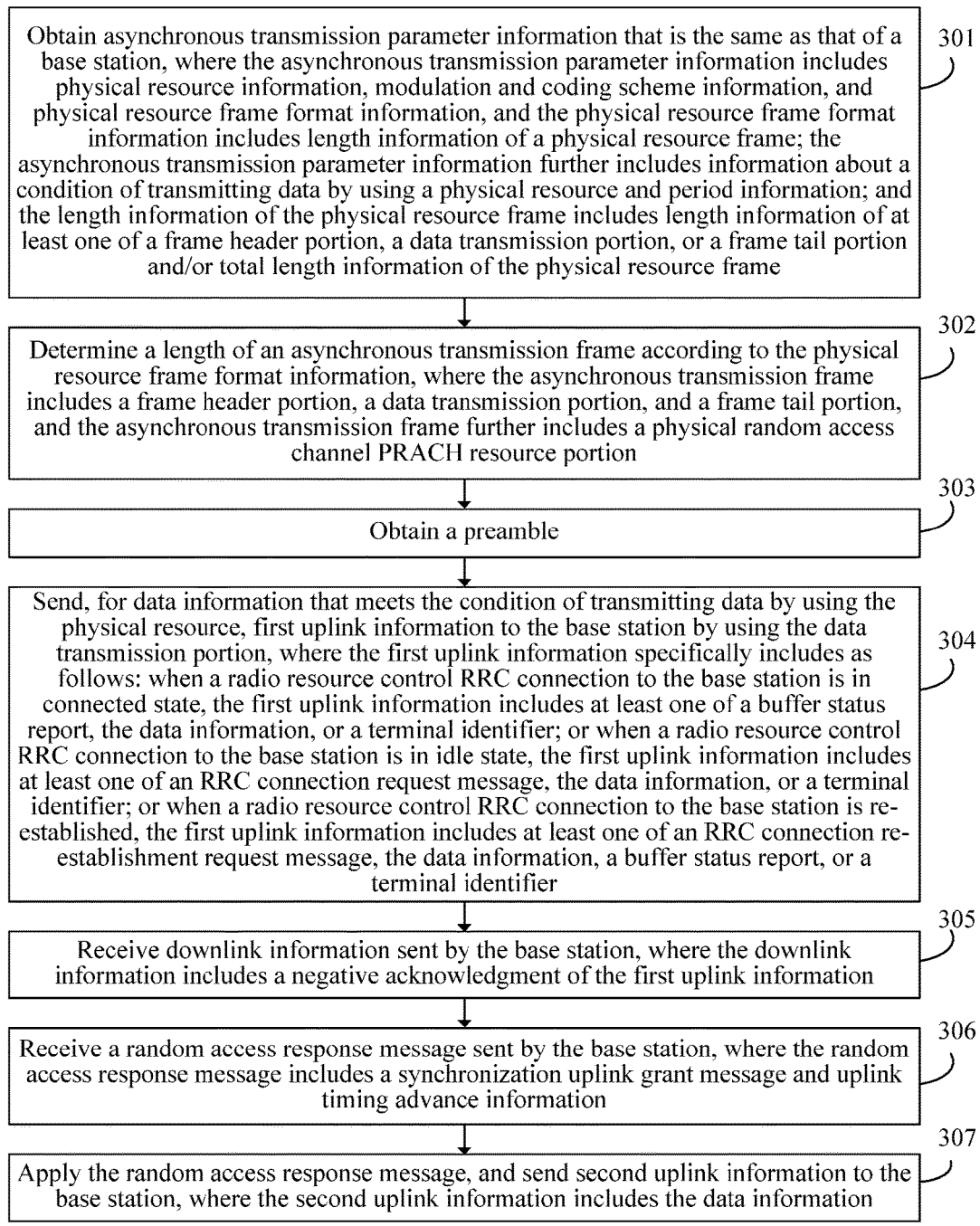
FIG. 11 is a schematic diagram of an embodiment of a method for asynchronous uplink transmission according to an embodiment of the present invention.

As described in the foregoing embodiment, the terminal sends the first uplink information to the base station according to the asynchronous transmission parameter information by using the asynchronous transmission frame. In an actual application, the asynchronous transmission frame may further include a physical random access channel PARCH resource portion, used to transmit a preamble. Alternatively, when the asynchronous transmission frame is sent, a physical random access channel PARCH resource is also sent. The PARCH resource is used to transmit a preamble. A specific description is provided below. Referring to FIG. 11, another embodiment of a method for asynchronous uplink transmission according to an embodiment of the present invention includes the following steps.

301: Obtain asynchronous transmission parameter information that is the same as that of a base station, where the asynchronous transmission parameter information includes physical resource information, modulation and coding scheme information, and physical resource frame format information, and the physical resource frame format information includes length information of a physical resource frame; the asynchronous transmission parameter information further includes information about a condition of transmitting data by using a physical resource and period information; and the length information of the physical resource frame includes length information of at least one of a frame header portion, a data transmission portion, or a frame tail portion and/or total length information of the physical resource frame.

After determining asynchronous transmission parameters according to a requirement, the base station first sends the asynchronous transmission parameter information to a terminal. Alternatively, the terminal may obtain, in another manner, for example, protocol configuration, the asynchronous transmission parameter information that is the same as that of the base station. To implement signaling exchange, the asynchronous transmission parameters need to include the physical resource information and the modulation and coding scheme information. The physical resource is a time-frequency domain resource, and may be a PRB (physical resource block, physical resource block) location in an LTE (Long Term Evolution, Long Term Evolution) system. A modulation and coding scheme may be QPSK (Quadrature Phase Shift Keying, quadrature phase shift keying) or 1/2 coding or the like. To implement asynchronous transmission, the asynchronous transmission parameters further need to include the length information of the physical resource frame. To improve accuracy of uplink information received by the base station, the asynchronous transmission parameter information may further include the information about the condition of transmitting data by using the physical resource, that is, which radio bearer data may be transmitted on the physical resource. To save a channel resource, the asynchronous transmission parameter information further includes the period information, used to indicate a period used by the base station to send the physical resource, that is, how often the physical resource may be sent, or a how many times the physical resource may be sent. Length information of any portion of the physical resource frame and/or the total length information of the physical resource frame may be set according to an actual requirement, so that a length of an asynchronous transmission frame that is configured according to the physical resource frame is a length of a frame whose reception is allowed by the base station. The asynchronous transmission parameter information may further include an identifier associated with the physical resource. No limitation is set herein.

A method for determining asynchronous data transmission parameters by the base station may be implemented as follows. The parameters are semi-statically configured by using an RRC message, for example, a broadcast message or a dedicated RRC message. Alternatively, the parameters are dynamically configured by using a MAC layer or physical layer message, for example, a MAC CE or PDCCH signaling. Alternatively, the parameters are configured by using an RRC message and a MAC layer or physical layer message. Some parameters are notified by using the RRC message, and the other messages are notified by using the MAC layer or physical layer message. Alternatively, some parameters, for example, the length information of the physical resource frame, are fixed by using a protocol, and the other parameters are notified to the terminal in the foregoing manner. Optionally, the asynchronous transmission parameters may be sent to the terminal by using one or more messages. The asynchronous transmission parameters may be used by one terminal alone, or shared by multiple terminals. No limitation is set herein.

302: Determine a length of an asynchronous transmission frame according to the physical resource frame format information, where the asynchronous transmission frame includes a frame header portion, a data transmission portion, and a frame tail portion, and the asynchronous transmission frame further includes a physical random access channel PRACH resource portion.

The terminal configures the asynchronous transmission frame according to the length information of the physical resource frame. The length of the asynchronous transmission frame is a length required by asynchronous transmission between the terminal and the base station. Optionally, multiple asynchronous transmission frame formats may be further pre-configured. Each asynchronous transmission frame format corresponds to an identifier. The length information of the physical resource frame in the asynchronous transmission parameter information may also be an identifier. The terminal determines a specific used asynchronous transmission frame format according to the identifier, to determine the length of the asynchronous transmission frame.

303: Obtain a preamble.

The preamble may be obtained by the terminal from reserved preamble space, or may be allocated by the base station to the terminal. No limitation is set herein.

304: Send, for data information that meets the condition of transmitting data by using the physical resource, first uplink information to the base station by using the data transmission portion, where the first uplink information specifically includes as follows. when a radio resource control RRC connection to the base station is in connected state, the first uplink information includes at least one of a buffer status report, the data information, or a terminal identifier; or when a radio resource control RRC connection to the base station is in idle state, the first uplink information includes at least one of an RRC connection request message, the data information, or a terminal identifier; or when a radio resource control RRC connection to the base station is re-established, the first uplink information includes at least one of an RRC connection re-establishment request message, the data information, a buffer status report, or a terminal identifier.

Because the terminal sends the first uplink information to the base station according to the necessary asynchronous transmission parameter information by using the asynchronous transmission frame having the required length, the base station receives the asynchronous transmission frame, and may obtain the first uplink information. It should be noted that, when the terminal sends the first uplink information to the base station by using the asynchronous transmission frame, a used timing advance is 0. That is, the terminal determines a timing for receiving a downlink signal, uses the determined timing for receiving a downlink signal as a reference, and sends the first uplink information to the base station by using the asynchronous transmission frame. Transmitting, by using the data transmission portion, the data information that meets the condition of transmitting data by using the physical resource may avoid causing interference to data of another terminal in close time. The terminal may determine content of the first uplink information according to different states of the RRC connection to the base station. If the terminal is in RRC connected state, the terminal may directly send the buffer status report, to indicate a volume of data of the terminal that requires uplink transmission, and may further directly perform uplink transmission on the data information and the terminal identifier. For example, the terminal identifier is a C-RNTI (CellRadioNetworkTemporaryIdentifier, cell radio network temporary identifier). It should be noted that, when the asynchronous transmission parameters are used by the terminal alone, the identifier does not need to be carried. If the terminal is in RRC idle state, the terminal may send the RRC connection request message, or directly send the data information. If the terminal is in RRC connection re-established state, the terminal may send the RRC connection re-establishment request message, or directly send the data information and the buffer status report. The terminal sends the preamble to the base station, so that when the terminal fails to establish the connection to the base station, the terminal can still establish the connection by means of contention-based random access or non-contention-based random access.

305: Receive downlink information sent by the base station, where the downlink information includes a negative acknowledgment of the first uplink information.

When the base station fails to receive the first uplink information sent by the terminal, or fails to successfully parse out content of the first uplink information, the base station sends the downlink information to the terminal. The downlink information includes the negative acknowledgment of the first uplink information. It should be noted that step 305 is an optional step, because the base station may directly send a random access response message to the terminal when failing to receive the first uplink information sent by the terminal.

306: Receive a random access response message sent by the base station, where the random access response message includes a synchronization uplink grant message and uplink timing advance information.

When the base station fails to receive the first uplink information sent by the terminal, because the terminal sends the preamble to the base station, the base station may further send the random access response message to the terminal. The random access message includes the synchronization uplink grant message, used to indicate that the terminal may send the buffer status report or uplink data. The uplink timing advance information included in the random access message is used to indicate a time at which the terminal sends uplink information.

It should be noted that, generally, when the terminal receives the downlink information including the positive acknowledgment in step 204 in the foregoing embodiment, it indicates that the base station successfully receives the first uplink information. Therefore, the base station generally does not send the random access response message, and the terminal does not receive the random access response message nor applies random access response message for uplink sending. When the terminal receives the downlink information including the negative acknowledgment of the first uplink information, it indicates that the base station fails to receive the first uplink information. Therefore, if the base station successfully receives the preamble, the base station generally sends the random access response message, and the terminal performs a subsequent operation according to the random access response message.

307: Apply the random access response message, and send second uplink information to the base station, where the second uplink information includes the data information.

After receiving the random access response message, the terminal may establish the connection by means of contention-based random access or non-contention-based random access, and then perform synchronized uplink transmission. No limitation is set herein.

Optionally, content in the second uplink information may be the same as or different from that in the first uplink information. That is, the terminal may retransmit, by using the second uplink information, the first uplink information that is not successfully transmitted by using the asynchronous transmission frame. No limitation is set herein.

In this embodiment of the present invention, an asynchronous transmission frame further includes a physical random access channel PRACH resource portion, used to transmit a preamble. When a base station receives the asynchronous transmission frame, if failing to parse out a data transmission portion of the asynchronous transmission frame, the base station may further obtain the preamble in the PRACH resource, and then send a random access response message to a terminal to establish an RRC connection, so that the terminal may perform synchronized uplink transmission. Information exchange stability is improved.

Figure 12:
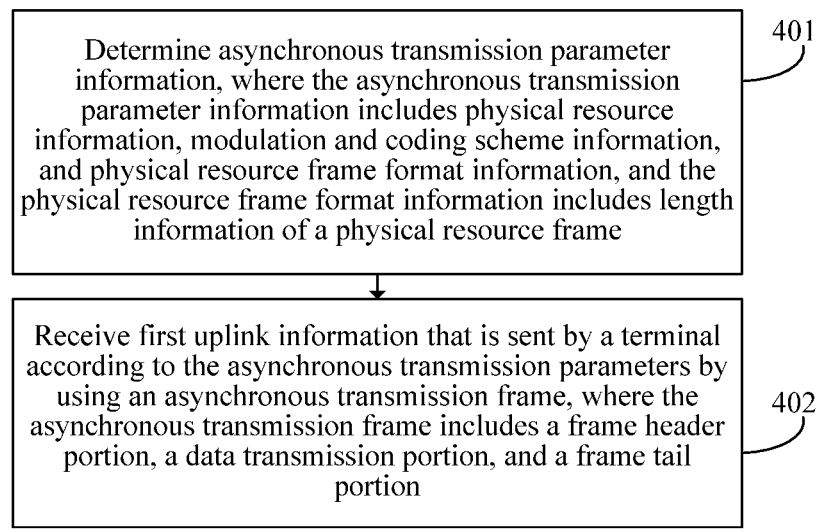
FIG. 12 is a schematic diagram of an embodiment of a method for asynchronous uplink transmission according to an embodiment of the present invention.

Referring to FIG. 12, another embodiment of a method for asynchronous uplink transmission according to an embodiment of the present invention includes the following steps.

401: Determine asynchronous transmission parameter information, where the asynchronous transmission parameter information includes physical resource information, modulation and coding scheme information, and physical resource frame format information, and the physical resource frame format information includes length information of a physical resource frame.

After determining asynchronous transmission parameters according to a requirement, a base station first sends the asynchronous transmission parameter information to a terminal. Alternatively, the terminal may obtain, in another manner, for example, protocol configuration, the asynchronous transmission parameter information that is the same as that of the base station. To implement signaling exchange, the asynchronous transmission parameters need to include the physical resource information and the modulation and coding scheme information. To implement asynchronous transmission, the asynchronous transmission parameters further need to include the length information of the physical resource frame.

402: Receive first uplink information that is sent by a terminal according to the asynchronous transmission parameters by using an asynchronous transmission frame, where the asynchronous transmission frame includes a frame header portion, a data transmission portion, and a frame tail portion.

The terminal configures the asynchronous transmission frame according to the length information of the physical resource frame. The length of the asynchronous transmission frame is a length required by asynchronous transmission between the terminal and the base station.

Because the terminal sends the first uplink information to the base station according to the necessary asynchronous transmission parameter information by using the asynchronous transmission frame having the required length, the base station receives the asynchronous transmission frame, and may obtain the first uplink information. It should be noted that, when the terminal sends the first uplink information to the base station by using the asynchronous transmission frame, a used timing advance is 0. That is, the terminal determines a timing for receiving a downlink signal, uses the determined timing for receiving a downlink signal as a reference, and sends the first uplink information to the base station by using the asynchronous transmission frame.

In this embodiment of the present invention, an asynchronous transmission frame sent by a terminal to a base station has a length of a frame whose reception is allowed by the base station. Therefore, the base station can receive the asynchronous transmission frame, and the base station parses out content of the asynchronous transmission frame, to obtain the first uplink information. In this way, even though the terminal and the base station are in out-of-synchronization state, the terminal can still perform uplink data transmission in time. An uplink data transmission latency and signaling overheads in out-of-synchronization state are reduced.

As described in the foregoing embodiment, a base station determines asynchronous transmission parameter information. The asynchronous transmission parameter information includes physical resource information, modulation and coding scheme information, and length information of a physical resource frame. The base station receives first uplink information that is sent by a terminal according to the asynchronous transmission parameters by using an asynchronous transmission frame. The asynchronous transmission frame includes a frame header portion, a data transmission portion, and a frame tail portion. In an actual application, specific content of the first uplink information may be determined according to a state of a connection between the terminal and the base station. The asynchronous transmission parameter information further includes information about a condition of transmitting data by using a physical resource. The length information of the physical resource may be a specific portion of the physical frame. The asynchronous transmission parameters may further include period information. The base station may further send downlink information to the terminal, and receives second uplink information sent by the terminal. A specific description is provided below. Referring to FIG. 13, another embodiment of a method for asynchronous uplink transmission according to an embodiment of the present invention includes the following steps.

501: Determine asynchronous transmission parameter information, where the asynchronous transmission parameter information includes physical resource information, modulation and coding scheme information, and physical resource frame format information, and the physical resource frame format information includes length information of a physical resource frame; the asynchronous transmission parameter information further includes information about a condition of transmitting data by using a physical resource and period information; and the length information of the physical resource frame includes length information of at least one of a frame header portion, a data transmission portion, or a frame tail portion and/or total length information of the physical resource frame.

After determining asynchronous transmission parameters according to a requirement, a base station first sends the asynchronous transmission parameter information to a terminal. Alternatively, the terminal may obtain, in another manner, for example, protocol configuration, the asynchronous transmission parameter information that is the same as that of the base station. To implement signaling exchange, the asynchronous transmission parameters need to include the physical resource information and the modulation and coding scheme information. The physical resource is a time-frequency domain resource, and may be a PRB (physical resource block, physical resource block) location in an LTE (Long Term Evolution, Long Term Evolution) system. A modulation and coding scheme may be QPSK (Quadrature Phase Shift Keying, quadrature phase shift keying) or 1/2 coding or the like. To implement asynchronous transmission, the asynchronous transmission parameters further need to include the length information of the physical resource frame. To improve accuracy of uplink information received by the base station, the asynchronous transmission parameter information may further include the information about the condition of transmitting data by using the physical resource, that is, which radio bearer data may be transmitted on the physical resource. To save a channel resource, the asynchronous transmission parameter information further includes the period information, used to indicate a period used by the base station to send the physical resource, that is, how often the physical resource may be sent, or a how many times the physical resource may be sent. Length information of any portion of the physical resource frame and/or the total length information of the physical resource frame may be set according to an actual requirement, so that a length of an asynchronous transmission frame that is configured according to the physical resource frame is a length of a frame whose reception is allowed by the base station. The asynchronous transmission parameter information may further include an identifier associated with the physical resource. No limitation is set herein.

A method for determining asynchronous data transmission parameters by the base station may be implemented as follows. The parameters are semi-statically configured by using an RRC message, for example, a broadcast message or a dedicated RRC message. Alternatively, the parameters are dynamically configured by using a MAC layer or physical layer message, for example, a MAC CE or PDCCH signaling. Alternatively, the parameters are configured by using an RRC message and a MAC layer or physical layer message. Some parameters are notified by using the RRC message, and the other messages are notified by using the MAC layer or physical layer message. Alternatively, some parameters, for example, the length information of the physical resource frame, are fixed by using a protocol, and the other parameters are notified to the terminal in the foregoing manner. Optionally, the asynchronous transmission parameters may be sent to the terminal by using one or more messages. The asynchronous transmission parameters may be used by one terminal alone, or shared by multiple terminals. No limitation is set herein.

502: Receive first uplink information that is sent, for data information that meets the condition of transmitting data by using the physical resource, by using a data transmission portion of the asynchronous transmission frame, where the asynchronous transmission frame includes a frame header portion, the data transmission portion, and a frame tail portion; and when a radio resource control RRC connection to the base station is in connected state, the first uplink information includes at least one of a buffer status report, the data information, or a terminal identifier; or when a radio resource control RRC connection to the base station is in idle state, the first uplink information includes at least one of an RRC connection request message, the data information, or a terminal identifier; or when a radio resource control RRC connection to the base station is re-established, the first uplink information includes at least one of an RRC connection re-establishment request message, the data information, a buffer status report, or a terminal identifier.

The terminal configures the asynchronous transmission frame according to the length information of the physical resource frame. The length of the asynchronous transmission frame is a length required by asynchronous transmission between the terminal and the base station. Optionally, multiple asynchronous transmission frame formats may be further pre-configured. Each asynchronous transmission frame format corresponds to an identifier. The length information of the physical resource frame in the asynchronous transmission parameter information may also be an identifier. The terminal determines a specific used asynchronous transmission frame format according to the identifier, to determine the length of the asynchronous transmission frame.

Because the terminal sends the first uplink information to the base station according to the necessary asynchronous transmission parameter information by using the asynchronous transmission frame having the required length, the base station receives the asynchronous transmission frame, and may obtain the first uplink information. It should be noted that, when the terminal sends the first uplink information to the base station by using the asynchronous transmission frame, a used timing advance is 0. That is, the terminal determines a timing for receiving a downlink signal, uses the determined timing for receiving a downlink signal as a reference, and sends the first uplink information to the base station by using the asynchronous transmission frame. Transmitting, by using the data transmission portion, the data information that meets the condition of transmitting data by using the physical resource may avoid causing interference to data of another terminal in close time. The terminal may determine content of the first uplink information according to different states of the RRC connection to the base station. If the terminal is in RRC connected state, the terminal may directly send the buffer status report, to indicate a volume of data of the terminal that requires uplink transmission, and may further directly perform uplink transmission on the data information and the terminal identifier. For example, the terminal identifier is a C-RNTI (CellRadioNetworkTemporaryIdentifier, cell radio network temporary identifier). It should be noted that, when the asynchronous transmission parameters are used by the terminal alone, the identifier does not need to be carried. If the terminal is in RRC idle state, the terminal may send the RRC connection request message, or directly send the data information. If the terminal is in RRC connection re-established state, the terminal may send the RRC connection re-establishment request message, or directly send the data information and the buffer status report.

503: Send downlink information to the terminal, where the downlink information includes an uplink timing adjustment command and a positive acknowledgment of the first uplink information; and when the radio resource control RRC connection to the terminal is in connected state, the downlink information further includes a synchronization uplink grant message and/or identification information of the terminal; or when the radio resource control RRC connection to the terminal is in idle state, the downlink information further includes an RRC connection establishment message; or when the radio resource control RRC connection to the terminal is re-established, the downlink information further includes a synchronization uplink grant message and/or an RRC connection re-establishment message.

Generally, an adjustment value in the uplink timing adjustment command is determined according to a deviation value between a time at which the base station receives the first uplink information and a receive window. For example, when the base station receives the first uplink information ΔT, for example, 1 μs, later than the receive window, the adjustment value added by the base station to the uplink timing adjustment command is ΔT. After receiving the adjustment value, the terminal uses the value ΔT in a subsequent data transmission process. No limitation is set herein.

The base station may determine content of the downlink information according to the states of the connection to the terminal. When the base station is in RRC connected state, the base station may send the synchronization uplink grant message, to instruct the terminal to send uplink data. The terminal may further send the terminal identifier. For example, the terminal identifier is the C-RNTI (CellRadioNetworkTemporaryIdentifier, cell radio network temporary identifier). It should be noted that, when the asynchronous transmission parameters are used by the terminal alone, the identifier does not need to be carried. If the base station is in RRC idle state, the base station may send the RRC connection establishment message, to instruct the terminal to establish an RRC connection to the base station. If the base station is in RRC connection re-established state, the base station may send the RRC connection re-establishment message, to instruct the terminal to re-establish the RRC connection to the base station, and may further send the synchronization uplink grant message, to instruct the terminal to send uplink data.

Optionally, the downlink information is masked by using an A-PUSCH-RNTI (Asynchronous Physical Uplink Shared Channel Radio Network Temporary Identifier, asynchronous physical uplink shared channel radio network temporary identifier) or a C-RNTI (CellRadioNetworkTemporaryIdentifier, cell radio network temporary identifier). Specifically, when the UE adds the C-RNTI to the uplink information, the downlink information may be masked by using the C-RNTI. When the UE adds the A-PUSCH-RNTI to the uplink information, the downlink information may be masked by using the A-PUSCH-RNTI.

Alternatively, the downlink information includes a negative acknowledgment of the first uplink information. After the terminal receives the downlink information including the negative acknowledgment of the first uplink information, the terminal initiates a random access process, or retransmits the first uplink information by using a new asynchronous transmission frame. Details are not described herein.

504: When the radio resource control RRC connection between the terminal and the base station is in connected state, receive second uplink information that is sent by the terminal according to the synchronization uplink grant message, where the second uplink information includes the data information; or when the radio resource control RRC connection between the terminal and the base station is in idle state, receive second uplink information that is sent by the terminal according to the RRC connection establishment message, where the second uplink information includes an RRC connection establishment complete message; or when the radio resource control RRC connection between the terminal and the base station is re-established, receive second uplink information that is sent by the terminal according to the RRC connection re-establishment message, where the second uplink information includes an RRC connection re-establishment complete message and/or the data information.

According to different states of the connection to the base station, the terminal sends second uplink information including different content to the base station. It should be noted that, when the RRC connection between the terminal and the base station is not in connected state, for a subsequent information exchange step after RRC connection establishment is completed, refer to the terminal in connected state of the RRC connection to the base station. Details are not described herein.

In this embodiment of the present invention, asynchronous transmission parameter information includes information about a condition of transmitting data by using a physical resource, so that accuracy of uplink information received by a base station is improved. The asynchronous transmission parameter information further includes period information, so that a channel resource is saved. For data information that meets the condition of transmitting data by using the physical resource, first uplink information is sent to the base station by using the data transmission portion, so that interference to data of another terminal in close time may be avoided. A terminal may determine content of the first uplink information according to different states of an RRC connection to the base station, so that information exchange efficiency is improved.

As described in the foregoing embodiment, the base station receives the first uplink information that is sent by the terminal according to the asynchronous transmission parameter information by using the asynchronous transmission frame. In an actual application, the asynchronous transmission frame may further include a physical random access channel PARCH resource portion, used to transmit a preamble. Alternatively, when the asynchronous transmission frame is sent, a physical random access channel PARCH resource is also sent. The PARCH resource is used to transmit a preamble. A specific description is provided below. Referring to FIG. 14, another embodiment of a method for asynchronous uplink transmission according to an embodiment of the present invention includes the following steps.

601: Determine asynchronous transmission parameter information, where the asynchronous transmission parameter information includes physical resource information, modulation and coding scheme information, and physical resource frame format information, and the physical resource frame format information includes length information of a physical resource frame; the asynchronous transmission parameter information further includes information about a condition of transmitting data by using a physical resource and period information; and the length information of the physical resource frame includes length information of at least one of a frame header portion, a data transmission portion, or a frame tail portion and/or total length information of the physical resource frame.

After determining asynchronous transmission parameters according to a requirement, a base station first sends the asynchronous transmission parameter information to a terminal. Alternatively, the terminal may obtain, in another manner, for example, protocol configuration, the asynchronous transmission parameter information that is the same as that of the base station. To implement signaling exchange, the asynchronous transmission parameters need to include the physical resource information and the modulation and coding scheme information. The physical resource is a time-frequency domain resource, and may be a PRB (physical resource block, physical resource block) location in an LTE (Long Term Evolution, Long Term Evolution) system. A modulation and coding scheme may be QPSK (Quadrature Phase Shift Keying, quadrature phase shift keying) or 1/2 coding or the like. To implement asynchronous transmission, the asynchronous transmission parameters further need to include the length information of the physical resource frame. To improve accuracy of uplink information received by the base station, the asynchronous transmission parameter information may further include the information about the condition of transmitting data by using the physical resource, that is, which radio bearer data may be transmitted on the physical resource. To save a channel resource, the asynchronous transmission parameter information further includes the period information, used to indicate a period used by the base station to send the physical resource, that is, how often the physical resource may be sent, or a how many times the physical resource may be sent. Length information of any portion of the physical resource frame and/or the total length information of the physical resource frame may be set according to an actual requirement, so that a length of an asynchronous transmission frame that is configured according to the physical resource frame is a length of a frame whose reception is allowed by the base station. The asynchronous transmission parameter information may further include an identifier associated with the physical resource. No limitation is set herein.

A method for determining asynchronous data transmission parameters by the base station may be implemented as follows. The parameters are semi-statically configured by using an RRC message, for example, a broadcast message or a dedicated RRC message. Alternatively, the parameters are dynamically configured by using a MAC layer or physical layer message, for example, a MAC CE or PDCCH signaling. Alternatively, the parameters are configured by using an RRC message and a MAC layer or physical layer message. Some parameters are notified by using the RRC message, and the other messages are notified by using the MAC layer or physical layer message. Alternatively, some parameters, for example, the length information of the physical resource frame, are fixed by using a protocol, and the other parameters are notified to the terminal in the foregoing manner. Optionally, the asynchronous transmission parameters may be sent to the terminal by using one or more messages. The asynchronous transmission parameters may be used by one terminal alone, or shared by multiple terminals. No limitation is set herein.

602: Receive a preamble that is sent by a terminal by using a PRACH resource portion of an asynchronous transmission frame, where the asynchronous transmission frame includes a frame header portion, a data transmission portion, a frame tail portion, and the random access channel PRACH resource portion.

The terminal configures the asynchronous transmission frame according to the length information of the physical resource frame. The length of the asynchronous transmission frame is a length required by asynchronous transmission between the terminal and the base station. Optionally, multiple asynchronous transmission frame formats may be further pre-configured. Each asynchronous transmission frame format corresponds to an identifier. The length information of the physical resource frame in the asynchronous transmission parameter information may also be an identifier. The terminal determines a specific used asynchronous transmission frame format according to the identifier, to determine the length of the asynchronous transmission frame. The preamble may be obtained by the terminal from reserved preamble space, or may be allocated by the base station to the terminal. No limitation is set herein.

603: Send downlink information to the terminal, where the downlink information includes a negative acknowledgment of the first uplink information.

When the base station fails to receive the first uplink information sent by the terminal, or fails to successfully parse out content of the first uplink information, the base station sends the downlink information to the terminal. The downlink information includes the negative acknowledgment of the first uplink information. It should be noted that step 603 is an optional step, because the base station may directly send a random access response message to the terminal when failing to receive the first uplink information sent by the terminal.

604: Send a random access response message to the terminal, where the random access response message includes synchronization uplink grant information and uplink timing advance information.

When the base station fails to receive the first uplink information sent by the terminal, because the terminal sends the preamble to the base station, the base station may further send the random access response message to the terminal. The random access message includes the synchronization uplink grant message, used to indicate that the terminal may send the buffer status report or uplink data. The uplink timing advance information included in the random access message is used to indicate a time at which the terminal sends uplink information.

It should be noted that, generally, when the terminal receives the downlink information including the positive acknowledgment in the foregoing embodiment, it indicates that the base station successfully receives the first uplink information. Therefore, the base station generally does not send the random access response message, and the terminal does not receive the random access response message nor applies random access response message for uplink sending. When the terminal receives the downlink information including the negative acknowledgment of the first uplink information, it indicates that the base station fails to receive the first uplink information. Therefore, if the base station successfully receives the preamble, the base station generally sends the random access response message, and the terminal performs a subsequent operation according to the random access response message.

605: Receive second uplink information sent by the terminal, where the second uplink information includes data information.

After receiving the random access response message, the terminal may establish the connection by means of contention-based random access or non-contention-based random access, and then perform synchronized uplink transmission. No limitation is set herein.

Optionally, content in the second uplink information may be the same as or different from that in the first uplink information. That is, the terminal may retransmit, by using the second uplink information, the first uplink information that is not successfully transmitted by using the asynchronous transmission frame. No limitation is set herein.

In this embodiment of the present invention, an asynchronous transmission frame further includes a physical random access channel PRACH resource portion, used to transmit a preamble. When a base station receives the asynchronous transmission frame, if failing to parse out a data transmission portion of the asynchronous transmission frame, the base station may further obtain the preamble in the PRACH resource, and then send a random access response message to a terminal to establish an RRC connection, so that the terminal may perform synchronized uplink transmission. Information exchange stability is improved.

It should be noted that, as described in the foregoing embodiment, the random access channel PRACH resource is in the asynchronous transmission frame. With such a method, the preamble and the asynchronous transmission frame have a same frequency band, but have different time. In an actual application, the PRACH resource may alternatively be sent as an independent frame, as long as the PRACH resource and the asynchronous transmission frame have same time. In this way, the preamble and the asynchronous transmission frame have same time, but have different frequency bands. Such an embodiment is similar to the foregoing embodiment. Details are not described herein.

Figure 15:
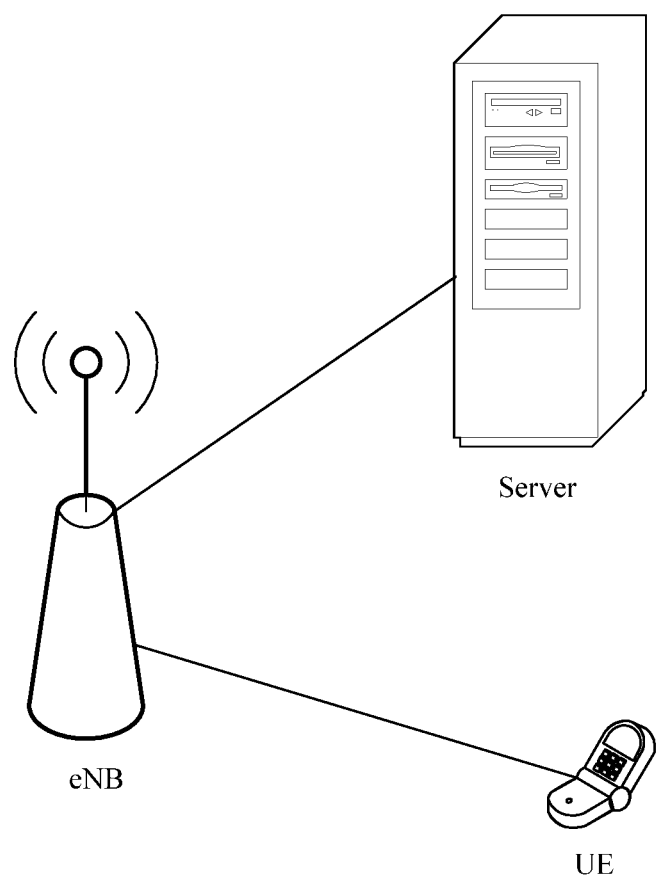
FIG. 15 is a schematic diagram of an embodiment of an application scenario of a method for asynchronous uplink transmission according to an embodiment of the present invention.

Referring to FIG. 15, using an example in which a terminal is UE and a base station is an eNB, an embodiment of a specific application scenario of a method for asynchronous uplink transmission according to an embodiment of the present invention includes as follows.

First, it is designed that an asynchronous transmission frame format includes a frame header CP, a CP length being 0.5 ms, a data transmission portion U-PUSCH, a U-PUSCH length being 1 ms, and a frame tail Tail, a Tail length being 0.5 ms. The eNB sends a time domain resource. a PRB location, a coding scheme QPSK, and asynchronous transmission frame format information to the UE by sending a physical layer message. The UE determines, according to the received information, the format, a length, the time domain resource, and the coding scheme for using an asynchronous transmission frame by the UE, and sets a timing advance to 0. The UE sends, to the eNB, first uplink information including a buffer status report, data information, and a terminal identifier. The eNB sends, to the UE, downlink information including a positive acknowledgment of the first uplink information, an uplink timing adjustment command, a synchronization uplink grant message, and identification information of the UE. The UE applies the timing adjustment command, starts a timing adjustment timer, and sends second uplink information including the data information to the eNB according to the synchronization uplink grant message.

In this embodiment of the present invention, asynchronous transmission parameter information that is the same as that of a base station is obtained. The asynchronous transmission parameter information includes physical resource information, modulation and coding scheme information, and physical resource frame format information, and the physical resource frame format information includes length information of a physical resource frame. A length of an asynchronous transmission frame is determined according to the physical resource frame format information. First uplink information is sent to the base station according to the asynchronous transmission parameter information by using the asynchronous transmission frame. Because the asynchronous transmission parameter information obtained by a terminal is the same as that of the base station, the length of the asynchronous transmission frame that is determined by the terminal is the same as that determined by the base station. Therefore, even though in out-of-synchronization state, when the terminal sends the first uplink information to the base station according to the asynchronous transmission parameter information by using the asynchronous transmission frame, the base station can still receive the first uplink information, implementing uplink transmission on data without first establishing an RRC connection by using signaling. In this way, an uplink data transmission latency and signaling overheads in out-of-synchronization state are reduced.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method for asynchronous uplink transmission, comprising:
   at a terminal, receiving asynchronous transmission parameter information for use by the terminal, the asynchronous transmission parameter information of the terminal being the same as that of an asynchronous transmission parameter information of a base station, wherein the asynchronous transmission parameter information comprises physical resource information, modulation and coding scheme information, and physical resource frame format information, and the physical resource frame format information comprises length information of a physical resource frame;
   setting a length of an asynchronous transmission frame according to the physical resource frame format information; and sending first uplink information to the base station according to the asynchronous transmission parameter information by using the asynchronous transmission frame having the set length.

2. The method according to claim 1, wherein the asynchronous transmission parameter information further comprises information about a condition of transmitting data by using a physical resource; and wherein sending the first uplink information comprises:
sending, for data information that meets the condition of transmitting data by using the physical resource, the first uplink information to the base station by using a data transmission portion of the asynchronous transmission frame.

3. The method according to claim 1, wherein the length information of the physical resource frame comprises:
length information of at least one of a frame header portion, a data transmission portion, or a frame tail portion and/or total length information of the physical resource frame.

4. The method according to claim 1, wherein the asynchronous transmission frame further comprises a physical random access channel (PRACH) resource portion, and before sending the first uplink information, the method further comprises:
obtaining a preamble;
wherein sending the first uplink information further comprises:
sending the preamble to the base station by using the PRACH resource portion; and
after sending the preamble, the method further comprises:
receiving a random access response message sent by the base station, wherein the random access response message comprises synchronization uplink grant information and uplink timing advance information; and
applying the random access response message, and sending second uplink information to the base station, wherein the second uplink information comprises data information.

5. The method according to claim 1, further comprising:
obtaining a preamble; and
sending the preamble to the base station by using a physical random access channel (PRACH) resource, wherein the PRACH resource and the asynchronous transmission frame are aligned in a time domain; and
after sending the preamble, the method further comprises:
receiving a random access response message sent by the base station, wherein the random access response message comprises synchronization uplink grant information and uplink timing advance information; and
applying the random access response message, and sending second uplink information to the base station, wherein the second uplink information comprises data information.

6. A method for asynchronous uplink transmission, comprising:
determining, at a base station, asynchronous transmission parameter information, wherein the asynchronous transmission parameter information comprises physical resource information, modulation and coding scheme information, and physical resource frame format information, and the physical resource frame format information comprises length information of a physical resource frame; and
receiving, at the base station, first uplink information that is sent by a terminal according to the asynchronous transmission parameter information by using an asynchronous transmission frame.

7. The method according to claim 6, wherein the asynchronous transmission parameter information further comprises information about a condition of transmitting data by using a physical resource; and
wherein receiving the first uplink information comprises:
receiving the first uplink information that is sent, for data information that meets the condition of transmitting data by using the physical resource, by using a data transmission portion of the asynchronous transmission frame.

8. The method according to claim 6, wherein the length information of the physical resource frame comprises:
length information of at least one of a frame header portion, a data transmission portion, or a frame tail portion and/or total length information of the physical resource frame.

9. The method according to claim 6, wherein the asynchronous transmission frame further comprises a physical random access channel (PRACH) resource portion, and receiving the first uplink information that is sent by a terminal according to the asynchronous transmission parameters by using an asynchronous transmission frame further comprises:
receiving a preamble that is sent by the terminal by using the PRACH resource portion;
sending a random access response message to the terminal, wherein the random access response message comprises synchronization uplink grant information and uplink timing advance information; and
receiving second uplink information sent by the terminal, wherein the second uplink information comprises data information.

10. The method according to claim 6, wherein the method further comprises:
receiving a preamble that is sent by the terminal by using a random access channel (PRACH) resource, wherein the PRACH resource and the asynchronous transmission frame are aligned in a time domain;
sending a random access response message to the terminal, wherein the random access response message comprises synchronization uplink grant information and uplink timing advance information; and
receiving second uplink information sent by the terminal, wherein the second uplink information comprises data information.

11. A terminal comprising:
a receiver configured to obtain asynchronous transmission parameter information for use by the terminal, the asynchronous transmission parameter information of the terminal being the same as that of an asynchronous transmission parameter information of a base station, wherein the asynchronous transmission parameter information comprises physical resource information, modulation and coding scheme information, and physical resource frame format information, and the physical resource frame format information comprises length information of a physical resource frame;
a processor;
a memory storing a program to be executed in the processor, the program comprising instructions configured to set a length of an asynchronous transmission frame according to the physical resource frame format information; and
a transmitter configured to send first uplink information to the base station according to the asynchronous transmission parameter information by using the asynchronous transmission frame having the set length.

12. The terminal according to claim 11, wherein the asynchronous transmission parameter information further comprises information about a condition of transmitting data by using a physical resource; and the transmitter is configured to send, for data information that meets the condition of transmitting data by using the physical resource, the first uplink information to the base station by using a data transmission portion of the asynchronous transmission frame.

13. The terminal according to claim 11, wherein the length information of the physical resource frame comprises:

length information of at least one of a frame header portion, a data transmission portion, or a frame tail portion and/or total length information of the physical resource frame.

14. The terminal according to claim 11, wherein the asynchronous transmission frame further comprises a physical random access channel (PRACH) resource portion, and before the first uplink information is sent to the base station, the receiver is further configured to obtain a preamble;

the transmitter is further configured to send the preamble to the base station by using the PRACH resource portion;

after the preamble is sent to the base station by using the PRACH resource portion, the receiver is further configured to receive a random access response message sent by the base station, wherein the random access response message comprises synchronization uplink grant information and uplink timing advance information;

the program comprises further instructions that are configured to apply the random access response message; and the transmitter is further configured to send second uplink information to the base station, wherein the second uplink information comprises data information.

15. The terminal according to claim 11, wherein the receiver is further configured to obtain a preamble;

the transmitter is further configured to send the preamble to the base station by using a physical random access channel (PRACH) resource, wherein the PRACH resource and the asynchronous transmission frame are aligned in a time domain;

after the preamble is sent to the base station by using a physical random access channel PRACH resource, the receiver is further configured to receive a random access response message sent by the base station, wherein the random access response message comprises synchronization uplink grant information and uplink timing advance information;

the program comprises further instructions that are configured to apply the random access response message; and the transmitter is further configured to send second uplink information to the base station, wherein the second uplink information comprises data information.

16. A base station comprising:

a processor;

a memory storing a program to be executed in the processor, the program comprising instructions configured to determine asynchronous transmission parameter information of the base station, wherein the asynchronous transmission parameter information comprises physical resource information, modulation and coding scheme information, and physical resource frame format information, and the physical resource frame format information comprises length information of a physical resource frame; and a receiver configured to receive first uplink information that is sent by a terminal according to the asynchronous transmission parameter information of the terminal by using an asynchronous transmission frame, wherein the asynchronous transmission parameter information of the base station is the same as the asynchronous transmission parameter information of the terminal.

17. The base station according to claim 16, wherein the asynchronous transmission parameter information further comprises information about a condition of transmitting data by using a physical resource; and the receiver is configured to receive the first uplink information that is sent, for data information that meets the condition of transmitting data by using the physical resource, by using a data transmission portion of the asynchronous transmission frame.

18. The base station according to claim 16, wherein the length information of the physical resource frame comprises:

length information of at least one of a frame header portion, a data transmission portion, or a frame tail portion and/or total length information of the physical resource frame.

19. The base station according to claim 16, wherein the asynchronous transmission frame further comprises a physical random access channel (PRACH) resource portion, and the receiver is further configured to receive a preamble that is sent by the terminal by using the PRACH resource portion;

the base station further comprises:

a transmitter configured to send a random access response message to the terminal, wherein the random access response message comprises synchronization uplink grant information and uplink timing advance information; and the receiver is further configured to receive second uplink information sent by the terminal, wherein the second uplink information comprises data information.

20. The base station according to claim 16, wherein the receiver is further configured to receive a preamble that is sent by the terminal by using a random access channel (PRACH) resource, wherein the PRACH resource and the asynchronous transmission frame are aligned in a time domain;

the base station further comprises:

a transmitter configured to send a random access response message to the terminal, wherein the random access response message comprises synchronization uplink grant information and uplink timing advance information; and the receiver is further configured to receive second uplink information sent by the terminal, wherein the second uplink information comprises data information.

* * * * *